(12) United States Patent
Engel et al.

(10) Patent No.: US 10,322,438 B2
(45) Date of Patent: Jun. 18, 2019

(54) FULLY VALIDATED MATERIAL HANDLING WITH SHUTTLE CONTAINER DELIVERY SYSTEM

(71) Applicant: Intelligrated Headquarters, LLC, Mason, OH (US)

(72) Inventors: Christopher M. Engel, Mason, OH (US); David Huff, Batavia, OH (US); Christopher Clinton Arnold, Loveland, OH (US); Justin Leib, Loveland, OH (US); Ralf Buerkle, Oregonia, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 15/713,979

(22) Filed: Sep. 25, 2017

(65) Prior Publication Data

US 2018/0085788 A1  Mar. 29, 2018

Related U.S. Application Data

(60) Provisional application No. 62/399,787, filed on Sep. 26, 2016.

(51) Int. Cl.
| | |
|---|---|
| *B65G 1/00* | (2006.01) |
| *B65G 1/04* | (2006.01) |
| *B65G 1/06* | (2006.01) |
| *B07C 3/08* | (2006.01) |
| *B07C 1/02* | (2006.01) |

(Continued)

(52) U.S. Cl.
CPC .............. *B07C 3/082* (2013.01); *B07C 1/025* (2013.01); *B07C 3/008* (2013.01); *B65G 1/0485* (2013.01); *B65G 1/1373* (2013.01); *B65G 1/1378* (2013.01); *B65G 47/96* (2013.01);
(Continued)

(58) Field of Classification Search
None
See application file for complete search history.

(56) References Cited

U.S. PATENT DOCUMENTS

| | | |
|---|---|---|
| 3,621,672 A | 11/1971 | Meredith |
| 4,151,447 A | 4/1979 | Von Der Heide et al. |

(Continued)

FOREIGN PATENT DOCUMENTS

| | | |
|---|---|---|
| CH | 532517 A | 11/1971 |
| DE | 21 58 537 A | 6/1972 |

(Continued)

OTHER PUBLICATIONS

International Search Report and Written Opinion for PCT/US2017/053191 dated Dec. 15, 2017.

*Primary Examiner* — Kavel Singh
(74) *Attorney, Agent, or Firm* — Alston & Bird LLP

(57) ABSTRACT

A material handling system reduces or eliminates human interaction with articles sorted and deposited into an order container to maintain validation and integrity of the order. Validated articles are inducted onto a sortation conveyor that selectively dispenses or deposits each article at a destination into a container. A shuttle vehicle moves along a first side of row of such containers to replace an empty container in place of any container that holds a completed order and moves the latter onto a transport conveyor.

15 Claims, 20 Drawing Sheets

(51) Int. Cl.
  *B07C 3/00* (2006.01)
  *B65G 1/137* (2006.01)
  *B65G 47/96* (2006.01)
  *B65G 17/34* (2006.01)
  *B65H 1/02* (2006.01)

(52) U.S. Cl.
  CPC ........ *B65G 17/345* (2013.01); *B65G 2209/04* (2013.01); *B65H 1/025* (2013.01)

(56) References Cited

U.S. PATENT DOCUMENTS

| | | |
|---|---|---|
| 4,468,165 A | 8/1984 | Kawasaki |
| 4,624,617 A | 11/1986 | Belna |
| 4,958,716 A | 9/1990 | Matsuo et al. |
| 5,263,300 A | 11/1993 | Plent et al. |
| 5,385,243 A | 1/1995 | Jackson et al. |
| 5,588,520 A | 12/1996 | Affaticati et al. |
| 5,718,321 A | 2/1998 | Brugger et al. |
| 5,803,704 A | 9/1998 | Lazzarotti |
| 5,959,868 A | 9/1999 | Oppliger et al. |
| 5,967,330 A | 10/1999 | Buer |
| 5,983,648 A | 11/1999 | Morchen |
| 6,024,425 A | 2/2000 | Imai et al. |
| 6,026,967 A | 2/2000 | Isaacs et al. |
| 6,253,901 B1 | 7/2001 | Hintz et al. |
| 6,253,904 B1 | 7/2001 | Soldavini |
| 6,276,509 B1 | 8/2001 | Schuster et al. |
| 6,501,041 B1 | 12/2002 | Burns et al. |
| 6,561,339 B1 | 5/2003 | Olsen et al. |
| 6,561,350 B1 | 5/2003 | Ueno |
| 6,561,360 B1 | 5/2003 | Kalm et al. |
| 6,597,969 B2 | 7/2003 | Greenwald et al. |
| 7,428,957 B2 | 9/2008 | Schaefer |
| 8,080,758 B2 * | 12/2011 | Rosenbaum ............ B07C 3/008 209/584 |
| 8,276,739 B2 * | 10/2012 | Bastian, II ............. B65G 1/026 198/347.1 |
| 2004/0197171 A1 | 10/2004 | Freudelsperger |
| 2005/0230222 A1 | 10/2005 | Olson et al. |
| 2011/0008138 A1 | 1/2011 | Yamashita |
| 2011/0155544 A1 | 6/2011 | Chastain |

FOREIGN PATENT DOCUMENTS

| | | |
|---|---|---|
| DE | 298 06 960 U | 9/1998 |
| DE | 297 24 039 U | 11/1999 |
| DE | 102 00 077 A | 12/2002 |
| DE | 101 36 354 A | 2/2003 |
| EP | 0495661 A2 | 7/1992 |
| EP | 0761322 A1 | 3/1997 |
| EP | 0774303 A2 | 5/1997 |
| JP | H04116001 A | 4/1992 |
| WO | WO 99/34936 | 7/1999 |
| WO | WO 2007/009136 A1 | 1/2007 |
| WO | WO 2008/091733 A2 | 7/2008 |

\* cited by examiner

| Sortation Technologies: Item Type | | Pill Bottle | Apparel | Envelope | Polybag | Bubble Mailer | Totes/Tray | Small Cartons <6x9 | Large Cartons >6x9 | Heavy Cartons >70lbs |
|---|---|---|---|---|---|---|---|---|---|---|
| Loop | Cross belt | ○ | * | ■ | * | * | ■ | * | * | ■ |
| | Tilt Tray | * | * | ■ | * | * | ■ | * | * | ■ |
| | Bomb bay/Flat | * | * | ■ | * | * | ○ | * | * | ○ |
| | Pusher Sorter | * | * | ■ | * | * | ■ | * | * | ■ |
| Line | Sliding Shoe Single Sided | ○ | ■ | ■ | * | * | * | * | * | * |
| | Sliding Shoe Dual Sided | ○ | ■ | ■ | * | * | * | * | * | * |
| | Intellisort HDS Sliding Shoe | ○ | * | ○ | * | * | ○ | ○ | ■ | ○ |
| | Sweeper Sort (single induct) | ○ | ○ | ○ | ○ | * | ○ | ○ | ■ | ○ |
| | Pop-Up Wheel Strip Belt | ○ | ○ | ○ | ○ | ■ | * | ○ | * | * |
| | Pop-Up Wheel Belt | ○ | ○ | ○ | ○ | ■ | * | ■ | * | * |
| | Slide Belt | ○ | ○ | ○ | ○ | ○ | * | ○ | * | * |
| | Strip Belt Transfer | ○ | ○ | ○ | ○ | ■ | * | ■ | * | ○ |
| | MDR Transfer/Divert | ○ | ○ | ○ | ○ | ■ | * | ■ | * | ○ |
| | Pusher | ○ | ○ | ○ | ○ | ■ | * | ■ | * | ○ |
| | Manual Process | * | * | * | * | * | * | * | * | ○ |

* = Excellent  
■ = Fair  
○ = Poor

FIG. 22 ary material handling control system, according to one or
more embodiments;

FULLY VALIDATED MATERIAL HANDLING WITH SHUTTLE CONTAINER DELIVERY SYSTEM

CROSS-REFERENCE TO RELATED APPLICATIONS

This application claims priority to U.S. Provisional Patent Application Ser. No. 62/399,787, filed 26 Sep. 2016, and entitled "Fully Validated Material Handling with Shuttle Container Delivery System", the contents of which is hereby incorporated by reference in its entirety.

BACKGROUND

The present disclosure relates generally to material handling of containers, packages, and discrete articles, and more specifically to techniques for segregating articles for order fulfillment and store replenishment within a material handling system.

In order to reduce the cost of storing a large inventory, increasingly retailers and distributors rely upon systems that can rapidly receive wholesale quantities of particular articles and create subsets of different articles as consumer or store replenishment orders. In some instances, a large number of possible types of articles can be selected from to complete a particular order. Automation allows conveying selected articles from a receiving location, sorting the needed articles into an order container, and transporting the completed order container to a shipping location. Generally, human interaction is required along some portion of the otherwise automated material handling system.

Requirements exist for certain types of articles that contain very sensitive, valuable, or statutorily controlled materials to tightly control specific individuals that can access the articles. In addition, single or double validation procedures can be required to confirm that any particular article is correctly received, stored, sorted and shipped from a material handling facility. Finding human operators that qualify to do such work can be difficult. In addition, correctly performing the validation steps by the human operators can be a time consuming and inconvenient process.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with a material handling system that reduces or eliminates human interaction with articles sorted and deposited into an order container to maintain validation and integrity of the order. Validated articles are inducted onto a loop sortation conveyor that selectively dispenses or deposits each article at a destination into a container. A shuttle vehicle moves along a first side of row of such containers to pace an empty container in place of any container that holds a completed order and moves the latter onto a transport conveyor. Thereby, in addition to the sorting or picking function, a task of placing empty containers and removing completed order containers that is often performed by a human operator is completely automated.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 22 illustrates a table of how various kinds of sorters handle a range of product types.

DETAILED DESCRIPTION

Figure 1A:
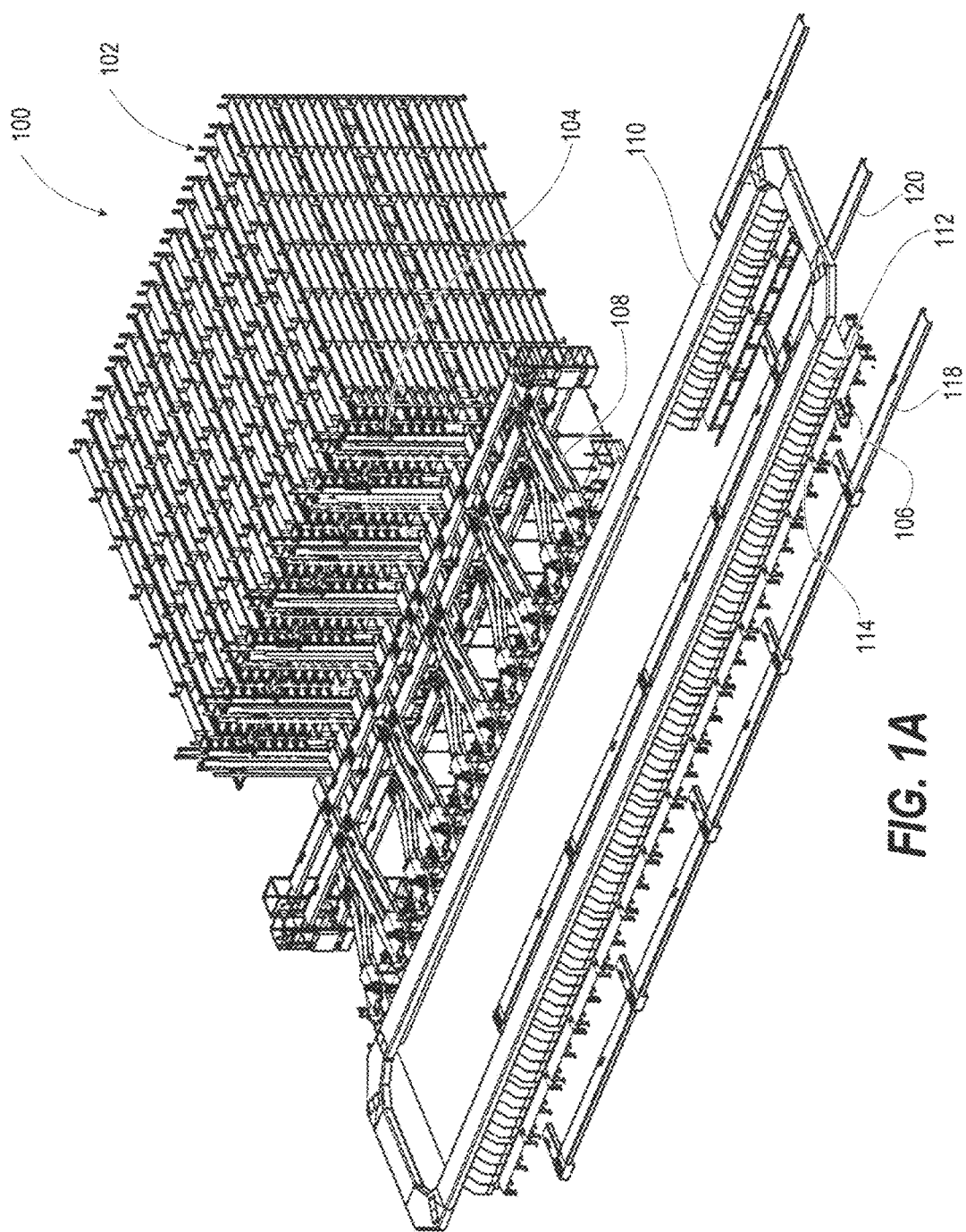
FIG. 1A illustrates a perspective view of a material handling system including an automatic storage and retrieval systems (ASRS), an induction conveyor, a sortation conveyor, a first transport mechanism and a second transport mechanism, according to one or more embodiments.

A material handling system reduces or eliminates human interaction with articles sorted and deposited into an order container to maintain validation and integrity of the order. Validated articles are inducted onto a loop sortation conveyor that selectively dispenses or deposits each article at a destination into a container. A shuttle vehicle moves along a first side of row of such containers to replace an empty container in place of any container that holds a completed order and moves the latter onto a transport conveyor. Loop sorters can employ carriers that discharge using various mechanizations including cross belts, tilt trays, pushers, and bomb bays or split trays that can efficiently and effectively discharge a wide variety of articles. Shuttle keeps each destination ready to receive a new order as soon as one is completed.

Generally-known approaches to automatically sorting articles into particular orders are only able to handle a particular type of article. For example, mail sorting equipment is optimized to handle uniformly sized envelopes.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

The terms "about" or "approximately" or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The present disclosure relates to material handling systems including a sortation conveyor that receives articles from an induction conveyor and selectively dispenses the articles at destination containers on a container support structure. A controller communicably coupled to a validation device of the induction conveyor to receive a first input signal pertaining to the articles validation information. Including a validation device to validate each article at the induction conveyors replace the manual process of validation performed by an operator and obviate the risk of theft of the articles.

The controller further receives a second input signal from a tracking device of the sortation conveyor. The controller generates a control signal to operate a transport mechanism based on the first input signal and the second input signal. The transport mechanism transports an empty destination container from an inlet conveyor and the destination containers to an outlet conveyor by extracting the destination containers from the container support structure and replacing the destination containers with the empty destination container on the container support structure based on the control signal received from the controller. Thereby, by employing such transportation mechanisms, the process of involving a human operator to manually replace the destination containers is completely automated substantially reducing the amount of manual labor processes required to replace the destination containers with empty destination containers at the sortation conveyor.

Figure 1B:
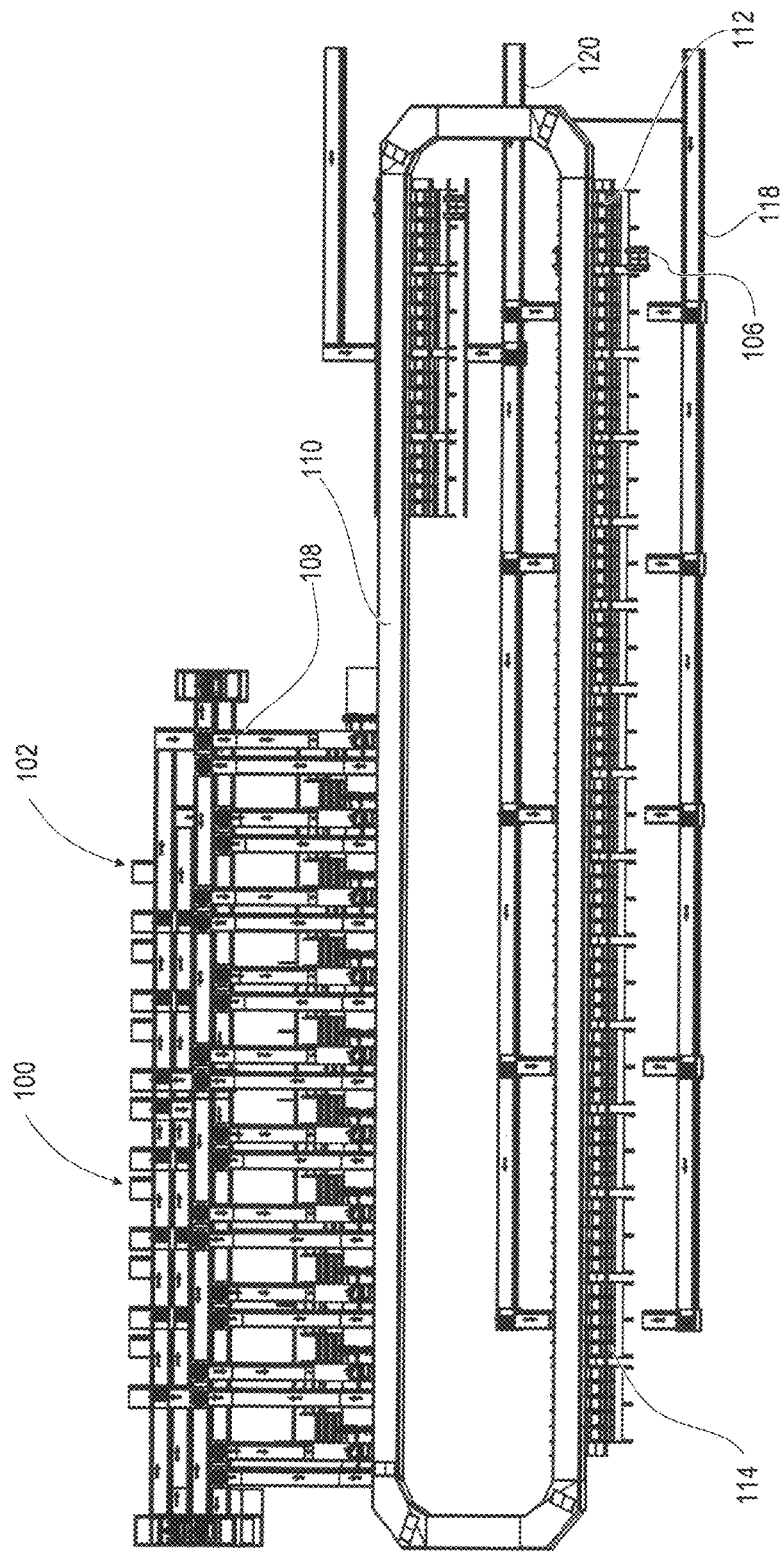
FIG. 1B illustrates a top view of the material handling system, according to one or more embodiments.

FIGS. 1A-1B illustrate a material handling system 100 including an automatic storage and retrieval systems (ASRS) 102, an induction conveyor 108, a sortation conveyor 110, a first transport mechanism 104 and a second transport mechanism 106. In the illustrated embodiment, the material handling system 100 may include an automatic storage and retrieval system 102 with multi-tiered racks containing storage units for storing articles. In an example, articles may be segregated into each storage unit based on a stock keeping unit (SKU) code, for example, a vendor provided code. In another example, articles may be segregated into each storage unit based on an article attribute, a serial number, or other unique identifiers. Each of the articles and their associated SKU code may be stored in a remote database of the material handling system 100 and retrieved by a controller of the material handling system 100 as and when an order fulfilment process is initiated. Further, the material handling system 100 may include a first transportation mechanism 104 and a second transport mechanism 106. The first transport mechanism 104 may be used in conjunction with the ASRS 102 and the second transport mechanism 106 may be used in conjunction with the sortation conveyor 110. For example, the first transport mechanism 104 and the second transport mechanism may be shuttle devices that transport articles, pertaining to a received order at the controller, from each storage units of the ASRS 102 to the induction conveyor 108. In another example, the first transport mechanism 104 may be a telescopic mechanism to be movable between each tier of the multi-tiered racks operable from either a projected position or a retracted position. In yet another example, the first transport mechanism 104 may be an autonomous vehicular transport robot. The autonomous vehicular transport robot may place the articles into the storage units in the multi-tier racks or selectively retrieve articles corresponding to the received order from the multi-tier racks. Generally, the articles transported to/from the storage units may be contained in carriers, for example, storage containers such as trays, totes or shipping cases, or on pallets.

The articles retrieved from the ASRS 102 corresponding to the received order are then transported to the induction conveyor 108 of the material handling system 100. According to an embodiment, the first transport mechanism 104 may deliver the articles retrieved from the ASRS 102 to the induction conveyor 108. For example, once an order is placed, the first transport mechanism 104 is actuated by the controller of the material handling system 100 to retrieve the order including the articles from the storage unit and transport them to the induction conveyor 108. According to an embodiment, the material handling system 100 may further include infeed conveyors, for example, accumulation type conveyors that may be provided at an inlet of each induction conveyor.

The articles may be inducted from the induction conveyor 108 onto the sortation conveyor 110. The material handling system may further include destination containers 112 adjacent to the sortation conveyor 110 to receive the articles diverted by guide structures of the sortation conveyor 110. The term "destination containers" and "discharge containers" may be used interchangeably throughout the specification. The guide structures, each positioned proximate to the sortation conveyor 110 to redirect the articles to their corresponding the destination containers 112. The destination containers 112 are longitudinally aligned on a container support structure 114. The container support structure 114 supports the destination containers 112. The material handling system includes the second transport mechanism 106 which is provided in close proximity with the container support structure 114 in order to transport the destination containers 112 from the sortation conveyor 110 to an outlet conveyor 120. The second transport mechanism further transports an empty destination container from an inlet conveyor 118 to the sortation conveyor 110 towards the container support structure 114. The inlet conveyor is a first transport conveyor aligned with and proximate to the container support structure to supply the empty destination container. The outlet conveyor is a second transport conveyor aligned with and proximate to the container support structure to receive the destination containers including articles corresponding to received orders fulfilled by the controller.

One example of a guide structure is a chute that receives an article diverted off of a lateral side of the sortation conveyor 100. Another example is vertical stacked positioning of the sortation conveyor 100 over top of the container support structure 114 for receiving an article that is selectively allowed to pass through a bottom of the sortation conveyor 100.

Figure 2:
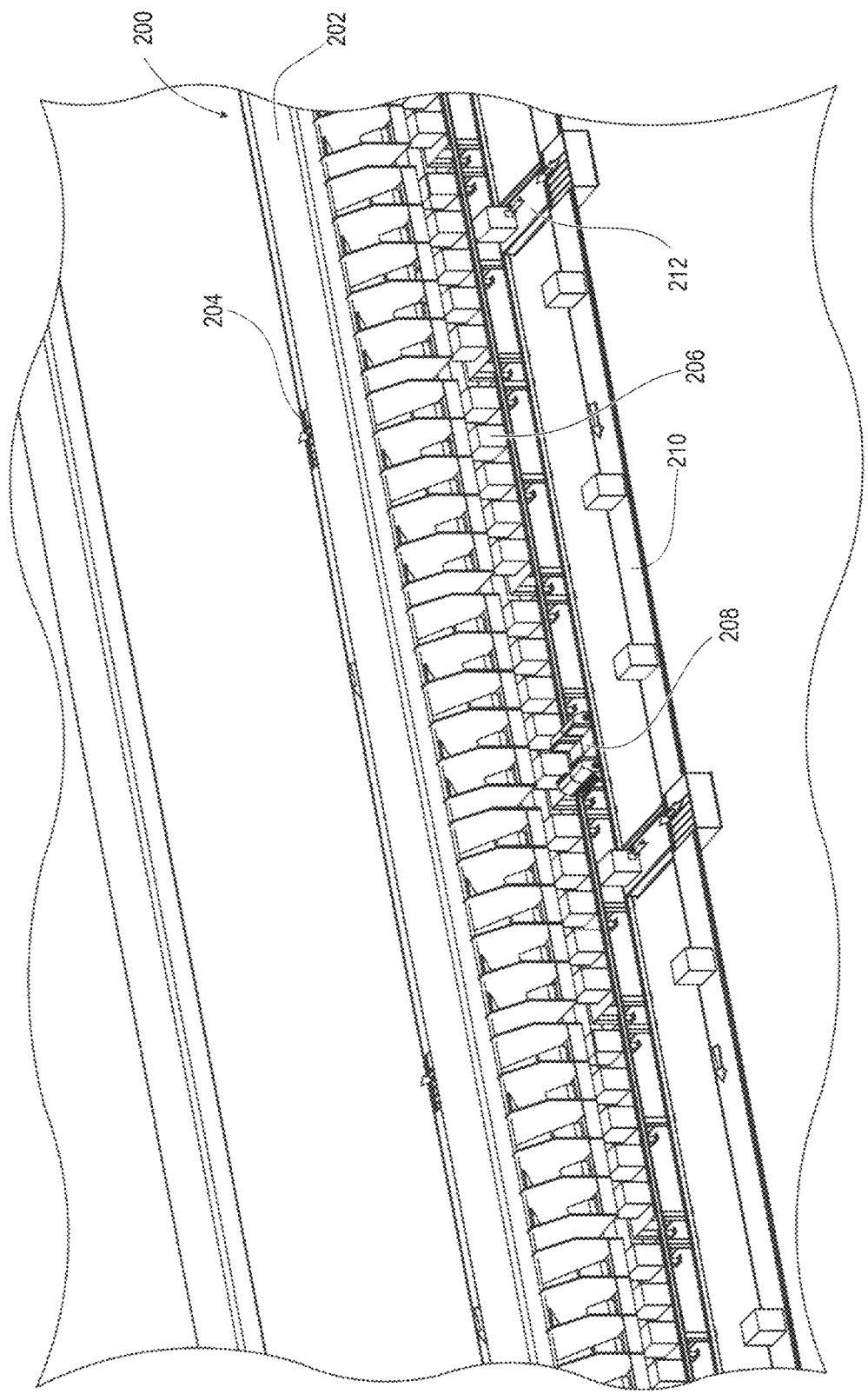
FIG. 2 illustrates an isometric detail view of a sortation conveyor of the material handling system having discharge containers arranged in a series, and the second transport mechanism operating in conjunction the sortation conveyor, according to one or more embodiments.

FIG. 2 illustrates an isometric detail view 200 of a sortation conveyor 202 of the material handling system 100 having discharge containers 206 arranged in a series, and the second transport mechanism 208 operating in conjunction the sortation conveyor 202. Generally, the sortation conveyor 202 of the type relevant to the present subject matter are adapted to run along a conveyor path which is usually made up of an endless loop of tracks in either a vertical or a horizontal plane. The sortation conveyor 202 may include load supporting surfaces and guide structures 204, such as, but not limited to, tilt trays, cross-belts, pushers and their like. For example, in the tilt tray sortation conveyor, each of the tilt tray may be adapted to be tilted, so as to unload an article being carried by a tray. In another example, in the cross belt sortation conveyor, cross-belts may be adapted to run transversely, usually perpendicularly, to the direction of travel of the conveyor, so as to thereby unload articles by movement of the cross-belt. Unloading stations in the form of destination containers 206 arranged in a series may be provided, at which the articles from the sortation conveyor 202 are unloaded. When an article has been unloaded from the load supporting surface of the sortation conveyor to the destination containers 206, the articles are transported by the second transport mechanism 208.

According to an embodiment, the second transport mechanism may include a shuttle device. The shuttle device 208 may include a support structure to support a container, for example, an empty destination container or a fully-filed or partially-filled destination container. According to another embodiment the second transport mechanism includes more than one shuttle devices. The more than one shuttle devices may include more than one support structure to support more than one container, for example, an empty destination container and a fully-filed or partially-filled destination container at any instance of time. In an example, the shuttle device is aligned with and proximate to the container support structure on an opposite side to an inlet conveyor 210 and the outlet conveyor 212.

According to an embodiment, the shuttle device may include a first pair of arms that extend towards the first transport conveyor to retrieve the empty destination container and extend towards the container support structure to displace the empty destination container from the shuttle device. According to an embodiment, in addition to the first pair of arms, the shuttle device may include a second pair of arms that extend towards the container support structure to retrieve the one or more destination containers that have received articles corresponding to the independent orders and extend towards the second transport conveyor to displace the empty destination container from the shuttle device.

The second transport mechanism 208 may transport the empty destination container from an inlet conveyor 210 and the fully-filed or partially-filled destination container to an outlet conveyor 212. The empty destination container may correspond to a container which is devoid of any articles. The fully-filed or partially-filled destination container may correspond to a container which includes articles corresponding to a received order fulfilled by the controller.

The inlet conveyor, for example, is an empty destination container delivery conveyor for supplying the empty destination container. The outlet conveyor, for example, may be a transport conveyor for transporting the fully-filed or partially-filled destination container for further processing. The second transport mechanism 208 may extract fully-filed or partially-filled destination container from a container support structure 205 and transport the fully-tiled or partially-filled destination container to the outlet conveyor 212. Further, the second transport mechanism 208 extracts the empty destination container from the inlet conveyor 210 and transport the empty destination container to the container support structure 205 to replace the transported fully-filed or partially-filled destination containers containing articles.

The second transport mechanism 208 may replace the fully-filed or partially-filled destination containers with the empty destination container on the container support structure 205 upon fulfillment of the received order at the destination containers 206. According to an embodiment, the second transport mechanism 208 including more than one support structure are capable of extracting the destination containers 206 containing articles corresponding to the received order and inserting the empty destination container in place of the extracted destination containers simultaneously.

According to another embodiment, the material handling system may include a third transport mechanism operable in conjunction with the second transport mechanism 208. The third transport mechanism, for example, is a shuttle device, that may extract the fully-filed or partially-filled destination containers from the container support structure 205 and deliver it to the outlet conveyor 212. Meanwhile, the second transport mechanism 208 may extract the empty destination container form the inlet conveyor 210 and insert it into the container support structure 205 for replacing the fully-filed or partially-filled destination containers extracted by the third transport mechanism. The operation of the second transport mechanism 208 and the third transport mechanism (not shown) may occur concurrently or sequentially. According to another embodiment, the operation of the second transport mechanism 208 and the third transport mechanism may be reversed. Thereby, by employing such transportation mechanisms, the process of involving a human operator to manually replace the destination containers is completely automated.

Figure 3:
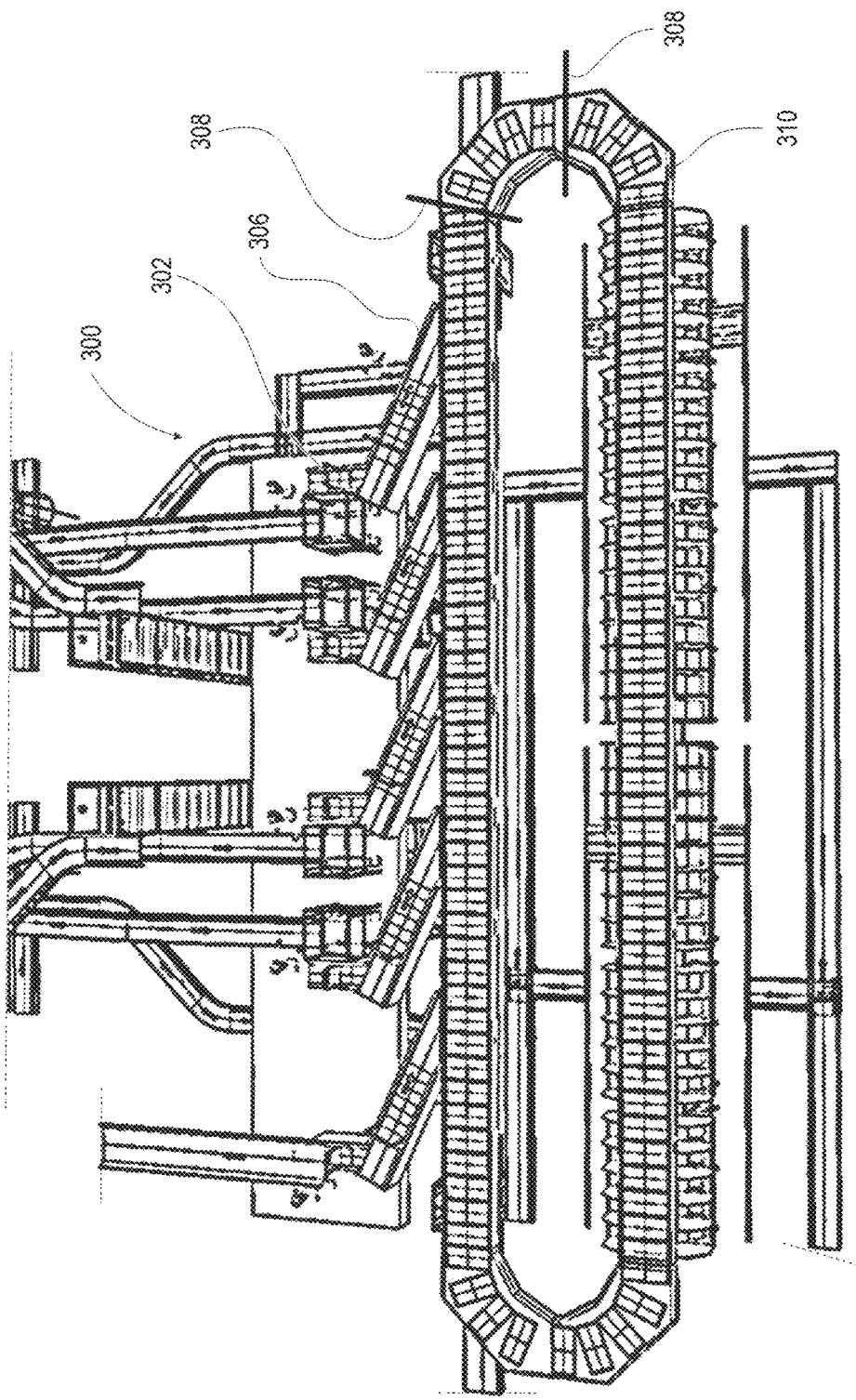
FIG. 3 illustrates a top view of a loop sorter serviced goods-to-operator (GTO) workstation for the material handling system installed with tracking devices, according to one or more embodiments.

FIG. 3 illustrates an example embodiment of a top view of a loop sorter serviced goods-to-operator (GTO) workstation for the material handling system installed with tracking devices. Goods-to-operator (GTO) workstations 302, hereinafter referred to as workstations, are positioned at an upstream end of an induction conveyor 306. Each workstation 302 may receive the articles retrieved from the ASRS. According to an embodiment, a first transport mechanism may transport the articles corresponding to a received order to the workstations 302. An operator at each workstation 302 may perform functions on each of the articles arriving at the workstation 302 and manually induct each article into the induction conveyor 306 after performing the functions. The functions performed on the articles, for example, includes applying a printed label on each article, scanning a machine readable or human readable indicia, determining a weight of the article and other related functions.

According to an embodiment, when the operator has finished performing a particular function, the first transport mechanism may transport the articles to the induction conveyor 306 rather than manual induction. The articles after being inducted either manually or automatically to the induction conveyor 306 may be validated using a validation device 304. Each validated article is then inducted on to a sortation conveyor 310. The sortation conveyor 310 may include tracking devices 308 installed at several locations either at an upstream or a downstream end of the sortation conveyor 310. The tracking device 308, for example, includes belt optical encoders, a series of RFID interrogators, over-the-belt cameras, photo eye, or photo sensor, article pass detection sensor, limit switch, proximity sensors and their like. According to an embodiment, each article may include a tracking number that uniquely identifies each article guided through the sortation conveyor 310. The tracking number, for example, is a machine readable code or symbol such as a bar code. The machine readable code is read by the tracking device to obtain tracking information pertaining to movement, status and location of each article corresponding to the received order at the controller. The obtained tracking information is transmitted as a second input signal in addition to the controller. For example, an order containing four articles is received at the controller. The controller monitors the status of the four articles across various stages of the material handling system by means of input signals received from devices installed at the material handling system. One such device is a tracking device installed at the material system that may provide input signals corresponding the movement, location, position, and redirection information of the tour articles contained in the order. On receiving these information, the controller may operate the second transport mechanism. The operation may include extracting a fully filled destination container that contains the four articles of the received order and replacing the fully filled destination container with the empty destination container.

Figure 4:
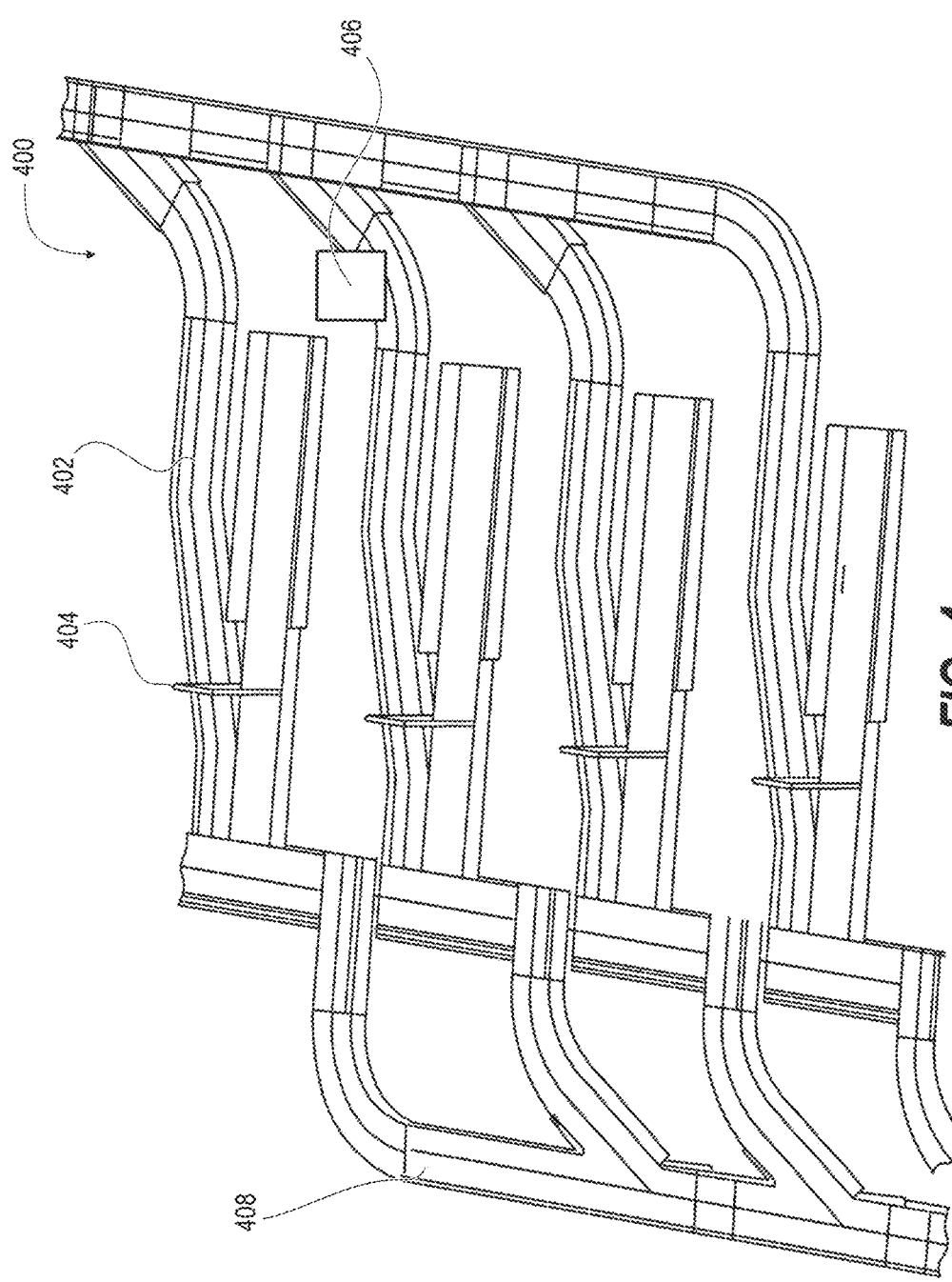
FIG. 4 illustrates a top view of induction conveyors installed with validation devices, according to one or more embodiments.

FIG. 4 illustrates an example embodiment of a top view 400 of induction conveyors installed with validation devices. In an example, the validation devices 404 may be provided on an induction conveyor, a sortation conveyor, or a transport conveyor. The validation device 404, for example, may be a validation scanner. The validation scanner 404 may be adapted to read a printed visual representation on each of the article 406. The printed visual representation corresponds to a unique article information of each article required for performing a validation. For example, the printed visual representation may be read using operations such as bar code scanning, laser sensing, vision sensing, digitally imaging, ultraviolet sensing, or radio frequency identification device reading. According to an embodiment, the printed visual representation may be machine readable indicia in an encoded form. The validation scanner 404 may be located at either an upstream or a downstream end of the induction conveyor 402. According to an embodiment, a controller performs the validation upon receiving the unique article information form the validation scanner 404. According to another embodiment, the validation scanner 404 in itself performs the validation for the articles. The validation may include comparing the unique article information of each article with a pre-loaded article information existing in a database. According to an embodiment, the validation scanner 404 may include an information storage unit for storing article information. The pre-loaded article information, for example, may exist in the form of a look-up table created in the database when an order is received at the controller. In an example, the unique article information may include physical attributes of the article, for example, article shape, article size, article weight, article visual appearance. In another example, the unique article information may include individualized shipping information such as end-user destination information, name, address, shipping code, tracking information, order number, invoice information, an article description, and their like.

The validation scanner 404 may transmit a first input signal to the controller after the validation of the unique article information. For example, an order containing four articles is received at the controller. The controller may monitor the status of the four articles across various stages of the material handling system by means of input signals received from devices installed at the material handling system. One such device may be a validation device installed at the material system that may provide input signals corresponding to the validation information of the four articles contained in the order. On receiving the validation information, the controller operates the second transport mechanism. The operation may include extracting a fully filled destination container that contains the four articles of the received order and replacing the fully filled destination container with the empty destination container. According to another embodiment, the controller operates the second transport mechanism in response to receiving both the first input signal from the validation and a second input signal from the tracking device as previously discussed.

According to an embodiment, the material handling system 100 may further include a merge conveyor unit 408 coupled to the induction conveyor 402. Each induction conveyor 402 deposits the articles into the merger conveying unit sequentially with the required spacing. Conventionally, an operator may be positioned at the induction station to visually determine the contents of a container containing the articles and select a destination for each of the article or the container. However, by installing the validation device at each induction conveyor 402 replaces the manual process of validation performed by the operator.

Figure 5:
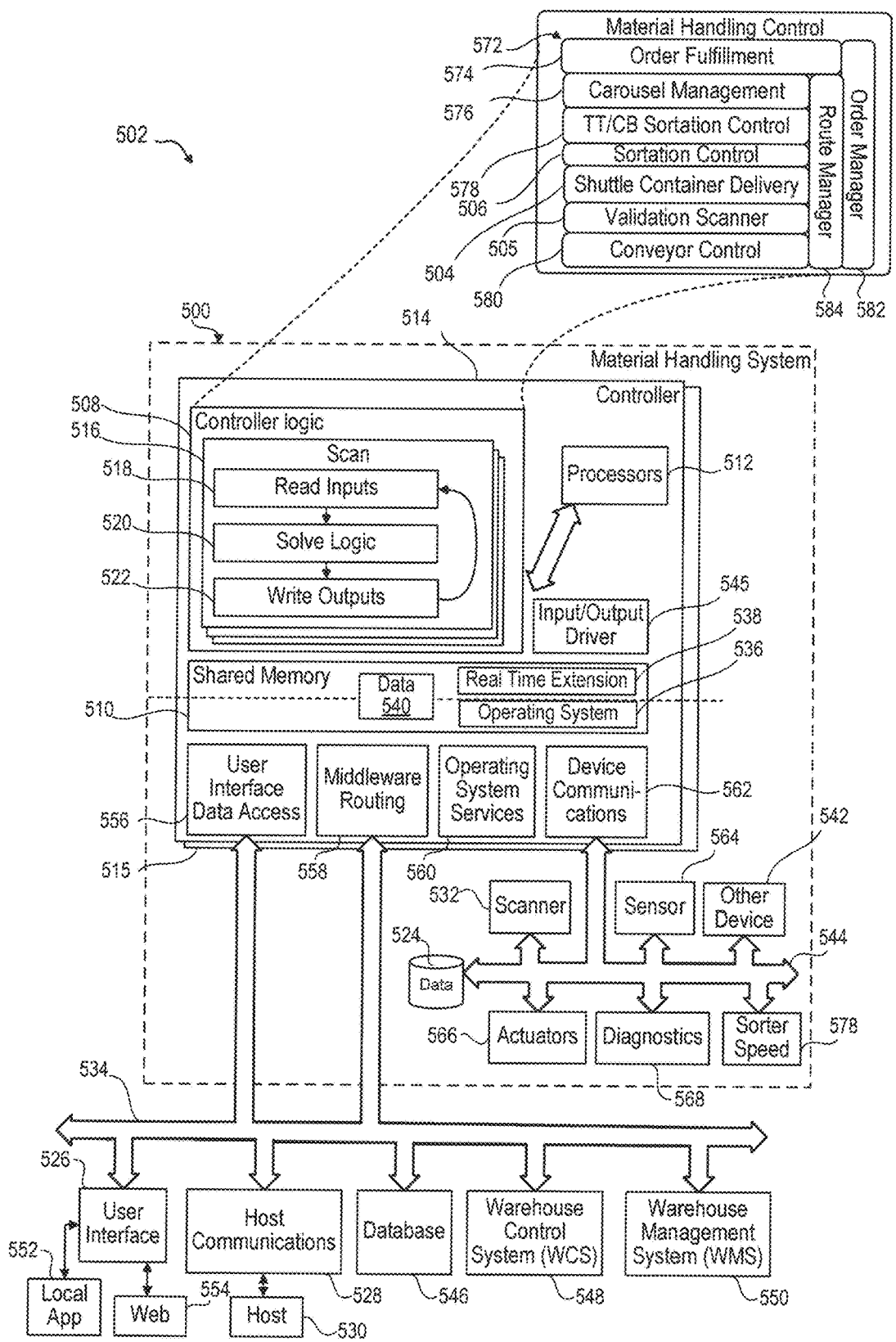
FIG. 5 illustrates a functional block diagram of an exemplary material handling control system, according to one or more embodiments.

FIG. 5 illustrates a functional block diagram of an exemplary material handling control system, according to one or more embodiments. An exemplary material handling system 500 of a distribution center processing architecture 502 is depicted. The shuttle container delivery controller 504 is implemented within a sortation control 506 as is a validation scanner control 505. Controller logic 508 stored in computer-readable, shared memory 510 is executed by processors 512 in a controller 514 of the material handling system 500. One function of the controller logic 508 can be machine control logic. The controller 514 can be a primary controller supported by a backup controller 515 such that maintenance personal could swap cables or connections in the event of a failure without undue service downtime. Alternatively, a supervising system or the self-diagnostics could cause automatic switching between primary and backup in the event of a failure.

Scan logic, or merely a scan 516, refers to an implementation within the controller logic 508. The processors 512 repeatedly execute a read input component 518, a solve logic component 520, and a write outputs component 522. By performing this sequence on a regular, periodic basis (deterministic), then the machine control logic can count scans to measure time. These three steps can be performed by a programmable logic controller (PLC), a personal computer (PC), a minicontroller, or microcontroller, etc. The solve logic component 520 can incorporate IF-THEN-ELSE branching logic, motion control, simple to sophisticates, hardlined to configured. Data, used by the solve logic component 520, can reside in the computer-readable, shared memory 510 or a data store device 524 (e.g., local, remote, cloud-based, etc.). A user interface 526 can be used to modify the solve logic component 520 such as by changing values that change the configuration or operation.

As is conventionally understood, the controller logic 508 can receive binary type inputs (e.g., switches, photo eyes, etc.) and generate binary type outputs (e.g., motor contacts, solenoid valves, lamp actuations, etc.). For example, in such an implementation, the user interface 526 can entail at least in part push button controls and lamps. More recent developments for controller logic 508 can include RS25 serial devices with cathode ray tube (CRT) screens and keyboards that enable dialog screens and data display along with printers for generating reports. Barcode scanning can detect items processed by the material handling system 500. More recently, wired and wireless communication within the material handling system 500 and distribution center processing architecture 502 enable more distributed and remotely isolated implementations. For example, such communication architectures may employ bus couplers such a PROFIBUS and ETHERCAT.

The scan 516 can be one of many control scans to support increased speeds and complexities for portions of the material handling system 500. Certain logic is required to be performed during shorter intervals than others and so the scans 516 can have different periodicities, often selected for convenience to occur as multiples of the shortest duration scan 516. Examples include scans 516 of 1 ms and 2 ms for motion control, 5 ms for a merge subsystem, and 211 ms for general conveyor.

The material handling system 500 can incorporate host communications 528 to a host system 530 using serial ports, Ethernet, file transfer protocol (FTP), Transfer Control Protocol/Internet Protocol (TCP/IP), etc. Thereby, the host system 530 can make decisions for the material handling system 500. For example, a scanner 532 can see a barcode. The barcode is sent to the host system 530, such as via a bridge 534. The host system 530 responds with a destination. In response, the material handling system 500 causes the item with the barcode to go to that destination. Alternatively, the process can entail receiving a batch or download of destinations mapped to barcodes as part of a lookup table (LUT) for reference by the material handling system 500.

The computer-readable shared memory 510 can allow execution of an operating system (e.g., Windows, LINX, etc.) 536 to execute with a real time extension 538. The real time extension 538 assures that the machine control logic (controller logic 508) gets to execute completely on the time schedule required. Variations in the execution schedule are measured in microseconds. This approach assures the kind of precision required for the machine control while retaining access to the power and flexibility of a general purpose Operating system (e.g., Windows). PLCs, which can also be included for machine control, can operate in their own proprietary environments (hardware and software) and are integrated using communications. Data 540 from these communications is stored in computer-readable shared memory 510 for use in control decisions and for display on user interface 526. In an exemplary version, the data 540 is not controlled by the real time extension 538. In a similar fashion, other communicating devices 542 used in the control process (e.g., scales, printers) are connected via a private internal communications bus (e.g., Ethernet) 544 to the processors 512. The controller 514 can also have internal input/output drivers 545 to interface using specific communication protocols.

The distribution center processing architecture 502 can include other systems external to the material handling system 500 that communicate via the bridge 534, such as a database 546, a warehouse control system (WCS) 548, and a warehouse management system (WMS) 550. In addition, the user interface 526 can facilitate remote or automated interaction via the user interface 526, depicted as a local application 552 and a web application 554. The controller 514 can include specific interfaces to support this interaction, such as a user interface data access component 556 to interact with user interface 526, middleware routing component 558 to interface with other external systems. Operating system services 560 and a device communication component 562 can also support the communications, such as sensors 564, actuators 566, diagnostic systems 568, and a sorter speed control 570.

The controller logic 508 can be functional described as material handling control layers 572 of software functionality, such as the sortation control 506 that address certain subsystems within a distribution center: order fulfillment 574, carousel management 576, tilt tray/cross belt (TT/CB) control 578, conveyor control 580, order manager 582 and route manager 584.

Figure 6:
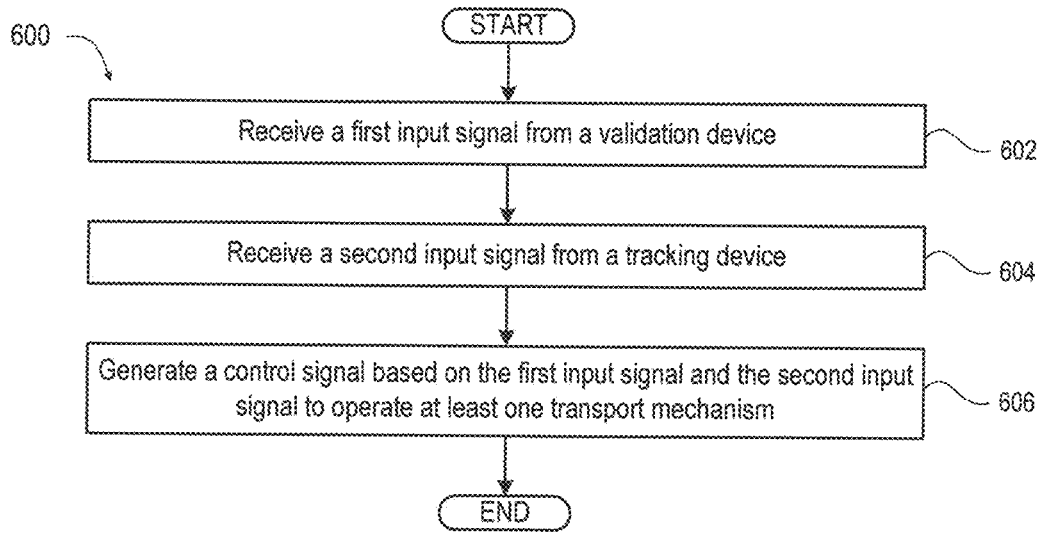
FIG. 6 illustrates a flow diagram of a method for controlling the operation of an automated transport mechanism in a material handling system, according to one or more embodiments.

FIG. 6 illustrates a flow diagram 600 of a method for controlling the operation of an automated transport mechanism in a material handling system. As shown in the figure, at block 602, a controller of the material handling system may receive a first input signal from a validation device. According to an embodiment, the validation device may be installed on an induction conveyor to validate each articles entering the induction conveyor before transporting the articles into a sortation conveyor. Further, at block 604, the controller receives a second input signal from a tracking device installed at an upstream end of the sortation conveyor. The controller, at block 606, upon receiving the first and second input signal, generates a control signal based on the first and second input signal to operate a second transport mechanism. The second transportation mechanism, for example, may be a shuttle device. For example, an order containing four articles is received at the controller. The controller may monitor the first input signal and the second input signal transmitted by the validation device and the tracking device respectively. The first input signal is triggered by the validation device after performing the validation of the four articles against parameters such as a unique article information relating to physical attributes of the article such as article shape, article size, article weight, article visual appearance, individualized shipping information such as end-user destination information, name, address, shipping code, tracking information, order number, invoice information, an article description, and their like. The second input signal may be triggered by the tracking device after performing the tracking of the four articles based on a tracking number to obtain details regarding movement, location, position, and redirection information of the four articles contained in the order. On receiving the first input signal pertaining to the validation information of the four articles and the second input signal pertaining to the tracking information of the four articles, the controller operates the second transport mechanism. The operation may include extracting a fully filled destination container that contains the four articles of the received order and replacing the fully filled destination container with the empty destination container.

Figure 7:
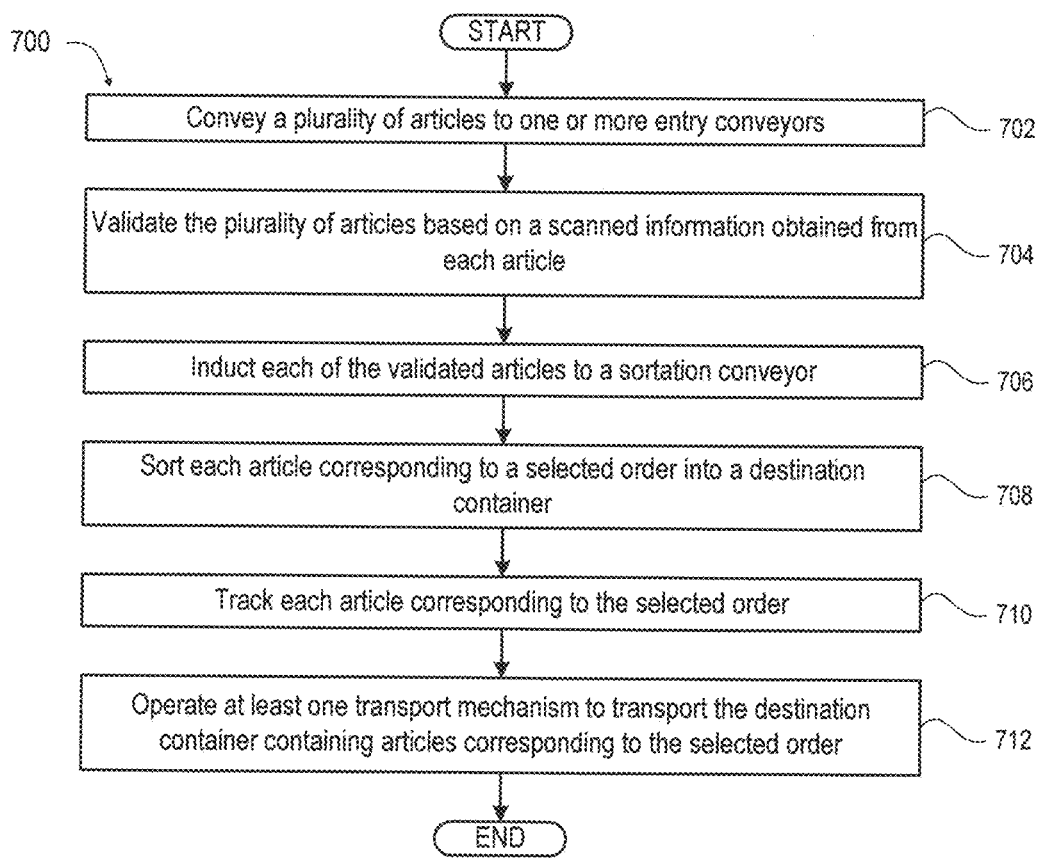
FIG. 7 illustrates a flow diagram of a method for automating receipt, induction, sortation, order fulfillment and operation of the automated transport mechanism, according to one or more embodiments.

FIG. 7 illustrates a flow diagram 709 of a method for automating receipt, induction, sortation, order fulfillment and operation of an automated transport mechanism. As shown in the figure, at block 702, the articles may be conveyed to induction conveyors from an ASRS either by an automated operation or a manual operation. At block 704, validating the articles on the one or more entry conveyors based on a scanned information obtained from each article. At block 706, the validated articles may be inducted onto a sortation conveyor that selectively dispenses or deposits each article to a destination container. At block 708, each article corresponding to a received order may be sorted into the destination container. At block 710, each article corresponding to the received order may be tracked by a tracking device installed at the sortation conveyor. The tracking device transmits tracking information including, but not limited to, a location of each article, position of each article and redirection information of each article included in the selected order to their respective destination containers. At block 712, the controller may receive identification, validation and tracking information of each of the article corresponding to the received order in the form of a first input signal and a second input signal. The controller determines to trigger a control signal to the automated transport mechanism based on received input signals. The automated transport mechanism is a second transportation mechanism. The automated transport mechanism may initiate its operation upon receiving the control signal from the controller. The operation of the automated transportation mechanism may include extracting each destination container containing articles of the selected order fulfilled by the material handling system. Each destination container may be extracted from a container support structure of the sortation conveyor and replaced with an empty destination container on the container support structure.

Further, the automated transport mechanism may extract the empty destination container from an inlet conveyor and transport the empty destination container to the container support structure supporting destination containers containing articles corresponding to the selected order. The destination containers may then be transported to the outlet conveyor. For example, the automated transport mechanism replaces a fully-filed or partially-filled destination containers with the empty destination containers on the container support structure upon fulfillment of the selected order at the destination containers. According to an embodiment, the outlet conveyor may optionally include validation devices to validate each article contained in their respective destination containers for further processing or shipping.

Accordingly, the present invention provides a continuous supply of empty container to the sortation conveyors, and automatically discharges filled or at least partially filled destination containers containing articles of a received order to an outfeed conveyor, thereby substantially reducing the amount of manual labor processes required to replace filled destination containers with empty destination containers at the sortation conveyor. Further, the present invention provides continuous tracking and validating of each article through various stages of the material handling system. Thereby, the process of involving a human operator to manually validate and track each article including replacement of the filled destination containers is completely automated.

Figure 8:
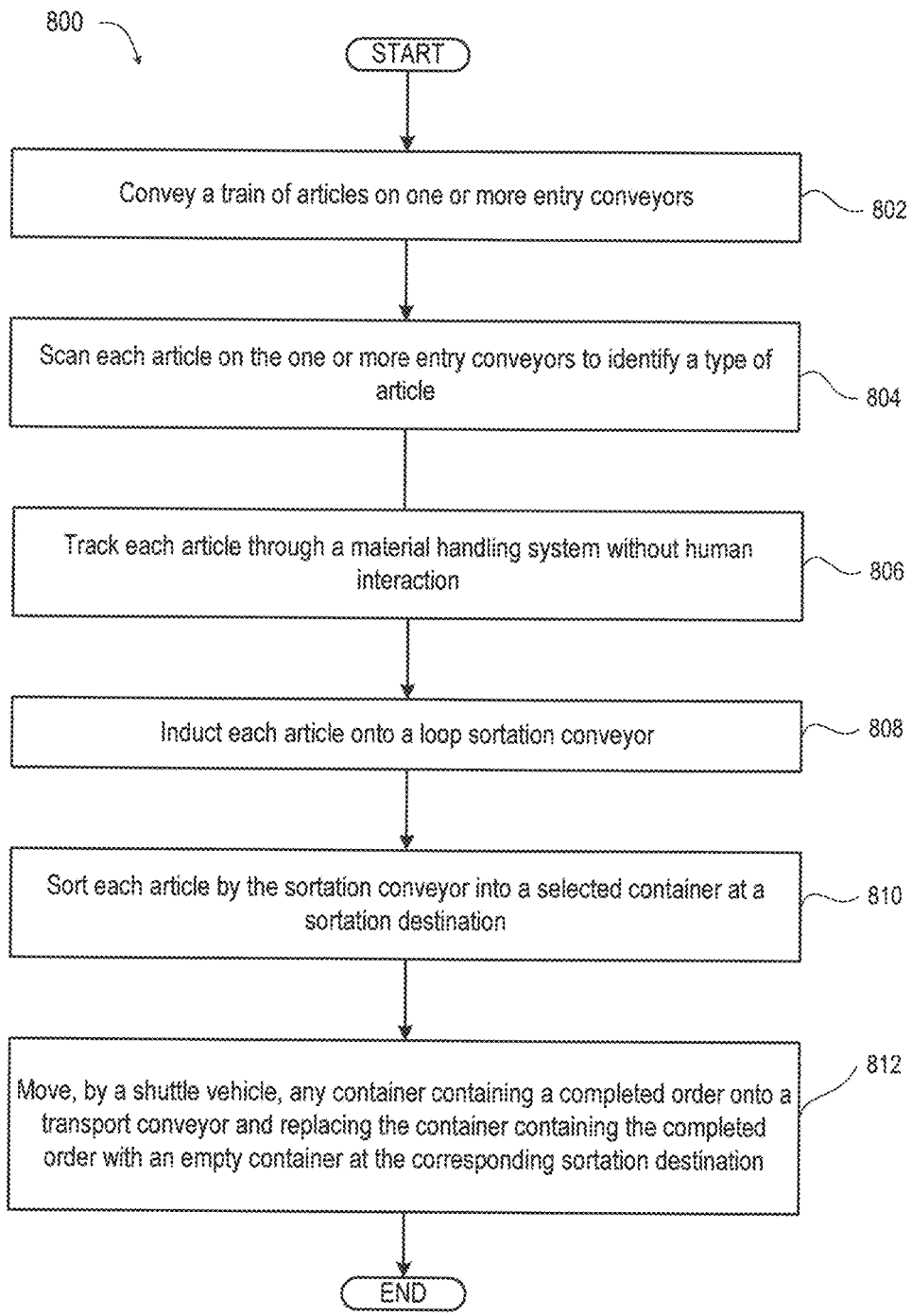
FIG. 8 illustrates a flow diagram of a method for automating receipt, sortation, order fulfillment and shipment of fully-validated articles, according to one or more embodiments.

In use, FIG. 8 illustrates a method 800 of automating receipt, sortation, order fulfillment and shipment of fully-validated articles. In one or more embodiments, the method 800 begins conveying a train of articles on one or more entry conveyors (block 802). Method 800 includes scanning each article on the one or more entry conveyors to identify a type of article (block 804). Method 800 includes tracking each article through a material handling system without human interaction (block 806). Method 800 includes inducting each article onto a sortation conveyor (block 808). Method 800 includes sorting each article by the sortation conveyor into a selected container at a sortation destination (block 810). Method 800 includes moving, by a shuttle vehicle, any container containing a completed order onto a transport conveyor and replacing the container containing the completed order with an empty container at the corresponding sortation destination (block 812). Then method 800 ends.

Figure 9:
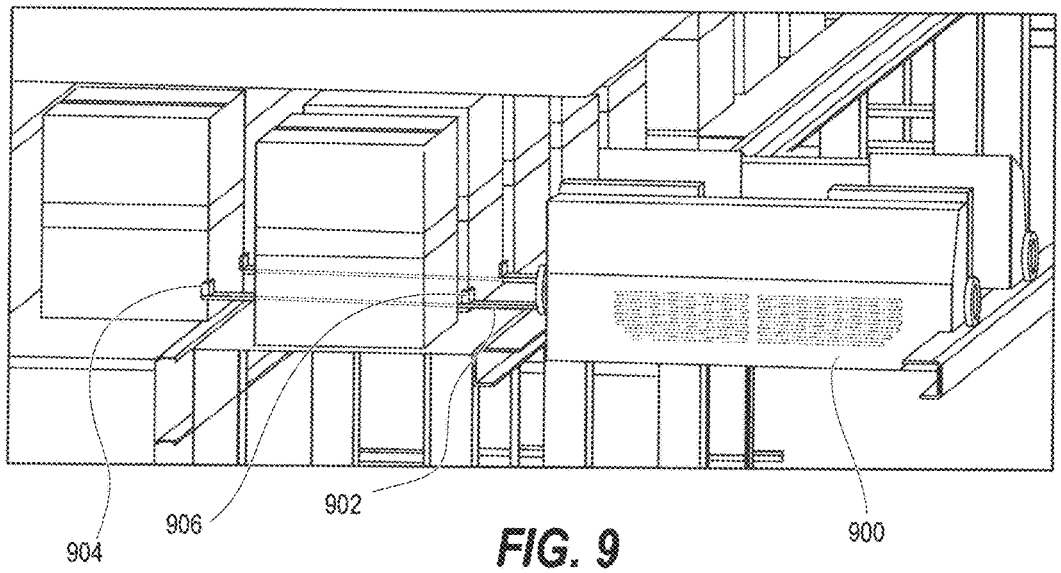
FIG. 9 illustrates an isometric view of a shuttle vehicle having dual container arms with fingers in an up position, according to one or more embodiments.
Figure 10:
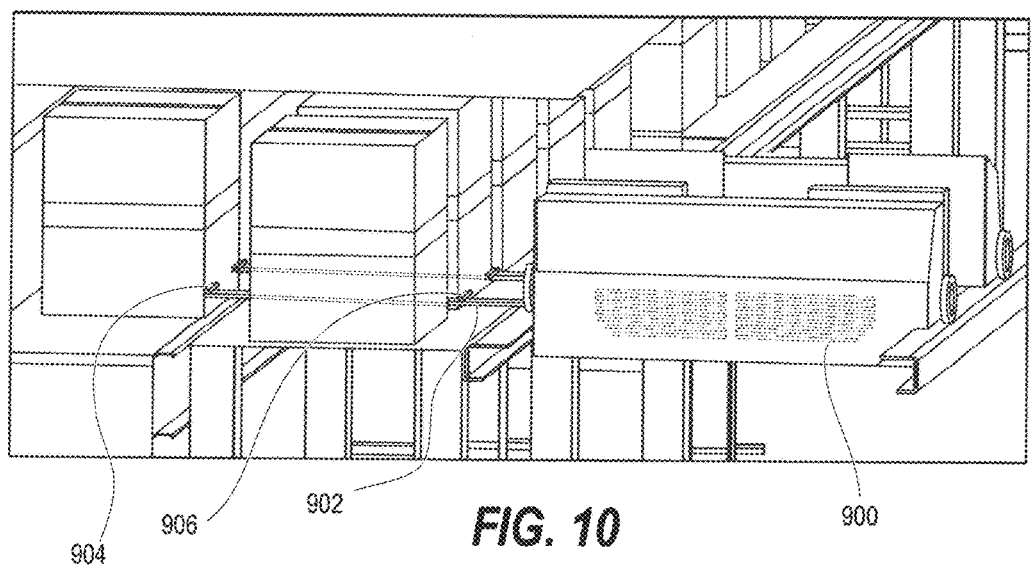
FIG. 10 illustrates an isometric view of the shuttle vehicle of FIG. 9 having dual container arms with fingers in a down position, according to one or more embodiments.

FIG. 9 illustrates a shuttle vehicle 900 having dual container arms 902 with distal and proximal fingers 904, 906 in an up position. FIG. 10 illustrates the shuttle vehicle 900 having dual container arms 902 with distal and proximal fingers 904, 906 in a down position. The shuttle vehicle 900 has fingers that rotate down to contact a container 906. The fingers 906 deliver the new order container by pushing the new order container into the order filling position from the shuttle vehicle 900 while at the same time pushing the completed order out onto takeaway conveyor The shuttle vehicle 900 replenishes order containers under a loop sorter (any size shuttle any size load; this could apply to any form factor: pallet, cases, totes, gaylords, truck trailers, other; any type of sorter. Use a carton shuttle to replenish order containers under a loop sorter (specifically smaller shuttle vehicles; carton/ease/totes—not pallets; under a loop sorter (tilt tray, bomb-bay, etc.)). The fingers rotate so they do not catch on anything and the arms retract back into the shuttle. The shuttle is then free to retrieve the next order container and repeat the process. The shuttle vehicle 900 pushes the existing container out while simultaneously pushing the next container in. The shuttle pulls the existing container out while simultaneously pulling the next container in. The shuttle moves the existing container out while simultaneously moving the next container in (push, pull, energize external drive mechanism, activate an air cylinder, etc.).

Figure 11:
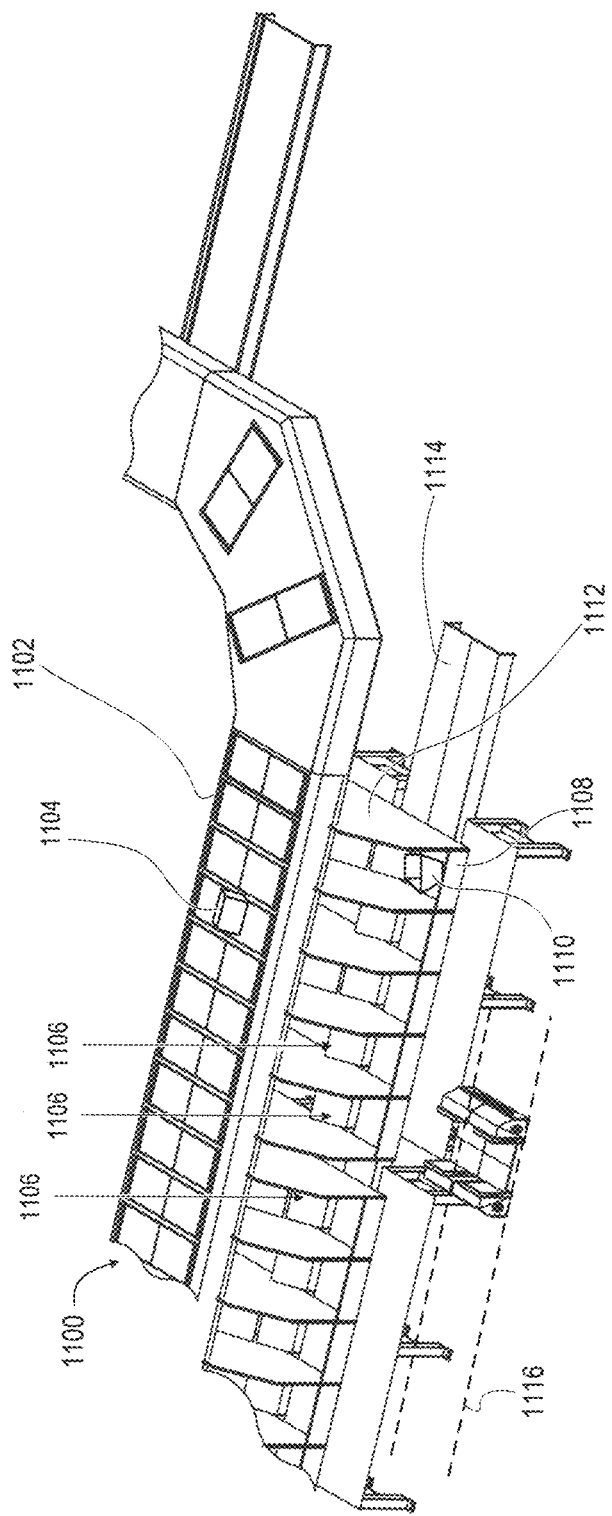
FIG. 11 illustrates an isometric view of an example order fulfillment section of the material handling system, according to one or more embodiments.

In one or more embodiments, FIG. 11 illustrates a material handling system 1100 that uses a loop sorter 1102 to handle a wide variety of articles 1104 for order fulfillment. In an exemplary embodiment, the loop sorter 1202 is a split tray or bomb bay loop sorter, although in other embodiments tilt tray, cross belt, pushers, etc., can be used. The loop sortation conveyor 1102 receives articles and selectively dispenses an article 1104 at one of more than one destination 1106. A container support structure 1108 is proximate to each of the more than one destination 1106 to hold more than one container 1110. More than one guide structure 1112 are each positioned at the respective one of more than one destination 1106 to direct the article to a corresponding container location on the container support structure 1108. In one or more embodiments, a transport conveyor 1114 is aligned with and proximate to the container support structure to receive containers 1110 that have received an order comprising selected articles 1104. A shuttle support structure 1116, such as wheel guide rails with a power bus bar, is aligned with and proximate to the container support structure 1108 on an opposite side to the transport conveyor 1114. At least one shuttle vehicle 1118 is received for movement on the shuttle support structure 1116. Each shuttle vehicle 1118 includes at least one load handler 1120 that replaces a selected container 1110 that has received an order with an empty container 1110 from the shuttle vehicle 1118.

Figure 12:
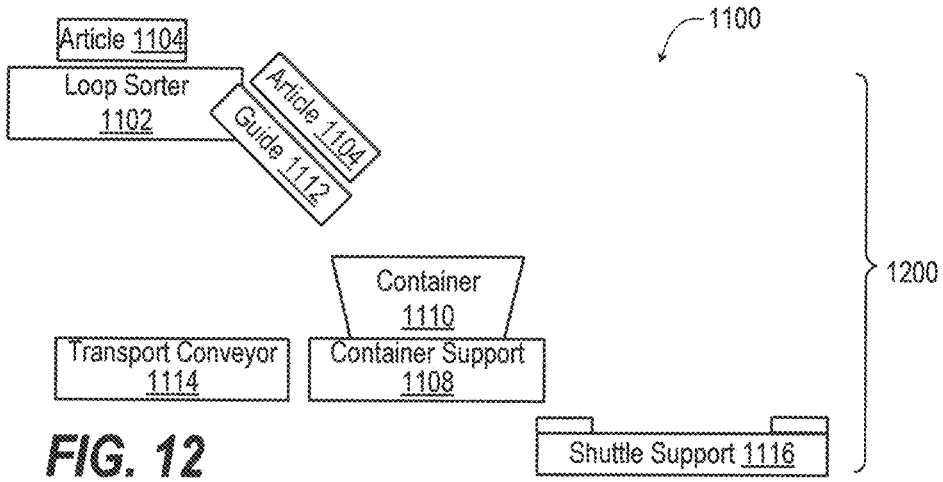
FIG. 12 illustrates a diagram of one destination of the example order fulfillment section receiving an article into an order container, according to one or more embodiments.
Figure 13:
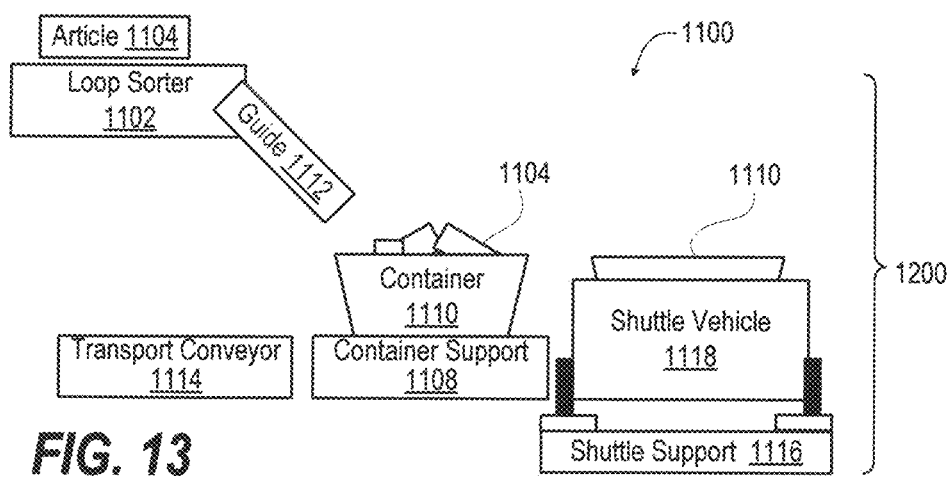
FIG. 13 illustrates a diagram of the example order fulfillment section of FIG. 12 having a shuttle vehicle with an empty container positioned at the destination next to the container holding a completed order, according to one or more embodiments.
Figure 14:
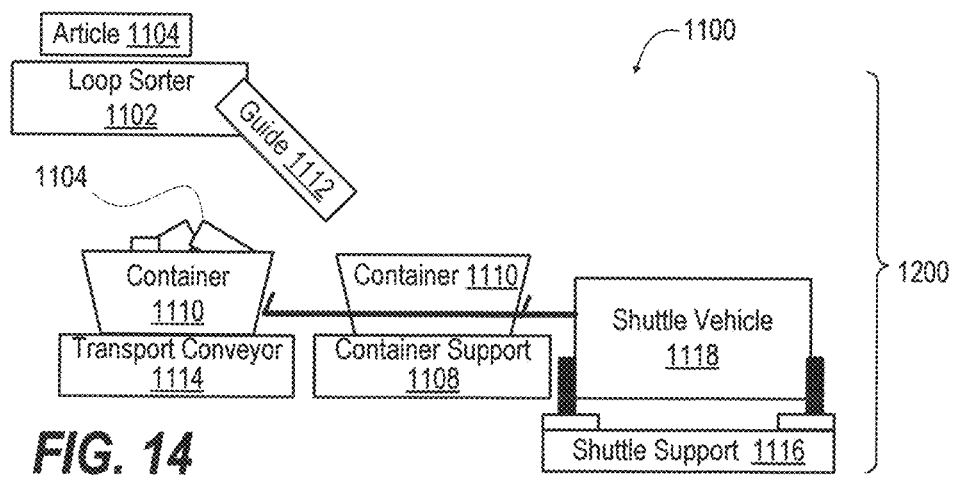
FIG. 14 illustrates a diagram of the example order fulfillment section of FIG. 13 with the shuttle vehicle simultaneous pushing the container with the completed order onto a transport conveyor and replacing the destination with the empty container, according to one or more embodiments.

FIGS. 12-14 illustrate an order fulfillment section 1200 of the material handling system 1100 in use. The example order fulfilment section 1200 uses a loop sortation conveyor ("loop sorter") 1102 to fill articles 1104, directed by a guide structure 1112, into a container 1110 at a particular destination 1106 on a container support structure 1108 to satisfy an order. FIG. 13 illustrates the example order fulfillment section 1200 having a shuttle vehicle 1118 with an empty container 1110 positioned at the destination 1106 next to the container 1110 on the container support structure 1108 that is holding a completed order. FIG. 14 illustrates the example order fulfillment section 1200 with the shuttle vehicle 1118 simultaneous pushing the container 1110 with the completed order onto a transport conveyor 1114 and replacing the destination 1106 with the empty container 1110.

Figure 15:
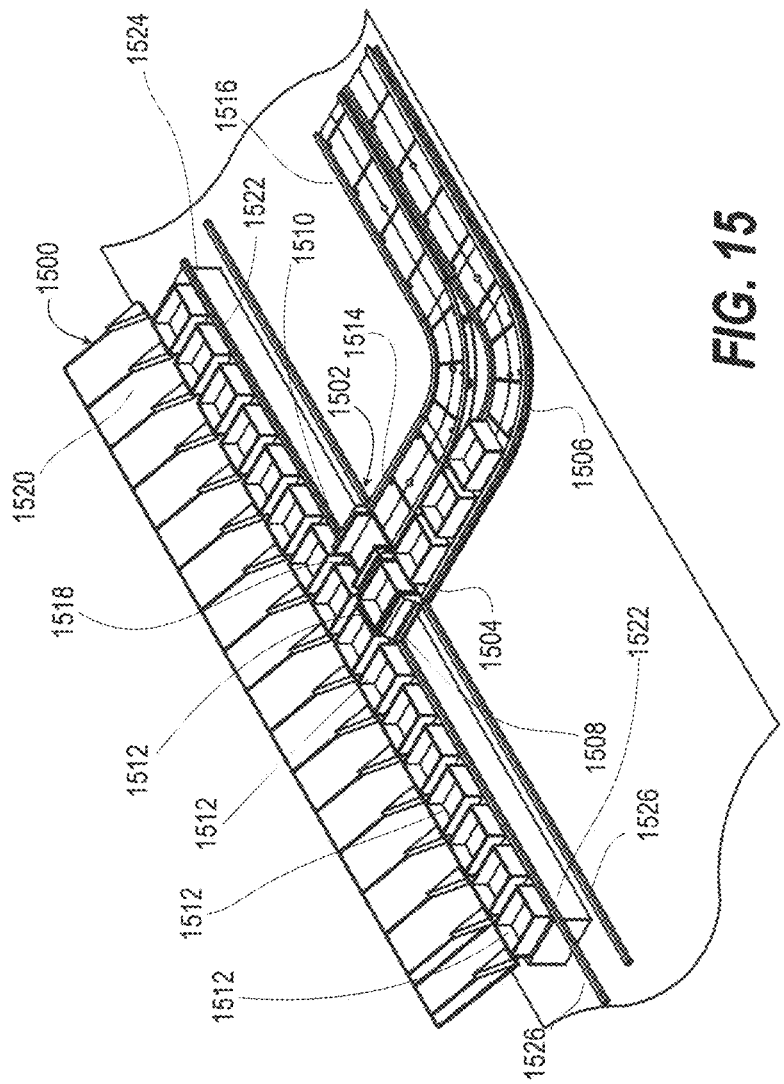
FIG. 15 illustrates an isometric view of another example order fulfillment section with pickup/delivery (P&D) station of a discharge end of one conveyor aligned with one shuttle of a dual shuttle vehicle to receive an order empty container and an intake end of another conveyor aligned with the other shuttle of the dual shuttle vehicle, according to one or more embodiments.

In another one or more embodiments, FIG. 15 illustrates another example order fulfillment section 1500 with a pickup/delivery (P&D) station 1502 comprised of a discharge end 1504 of one conveyor 1506 aligned with one shuttle 1508 of a dual shuttle vehicle 1510 to receive an order empty container 1512. The P&D station 1502 also includes an intake end 1514 of another conveyor 1516 aligned with another shuttle 1518 of the dual shuttle vehicle 1510. Guide structures are depicted as chutes 1520 that direct articles into order containers 1512 at respective destinations 1522 on a container support structure 1524 next to a shuttle support structure depicted as a pair of parallel guide channels 1526.

Figure 16:
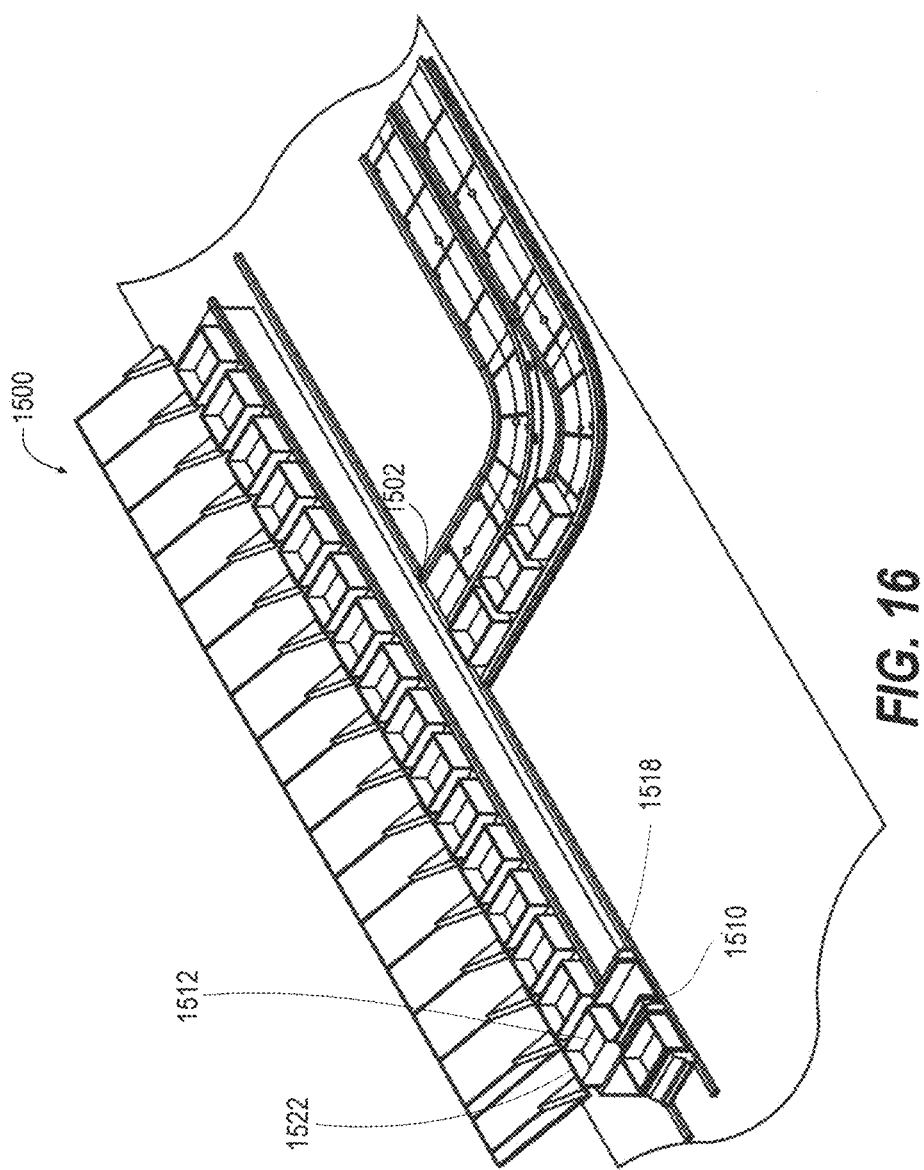
FIG. 16 illustrates an isometric view of the other example order fulfillment section of FIG. 15 with the dual shuttle vehicle having an empty shuttle aligned with a destination having a full order container, according to one or more embodiments.
Figure 17:
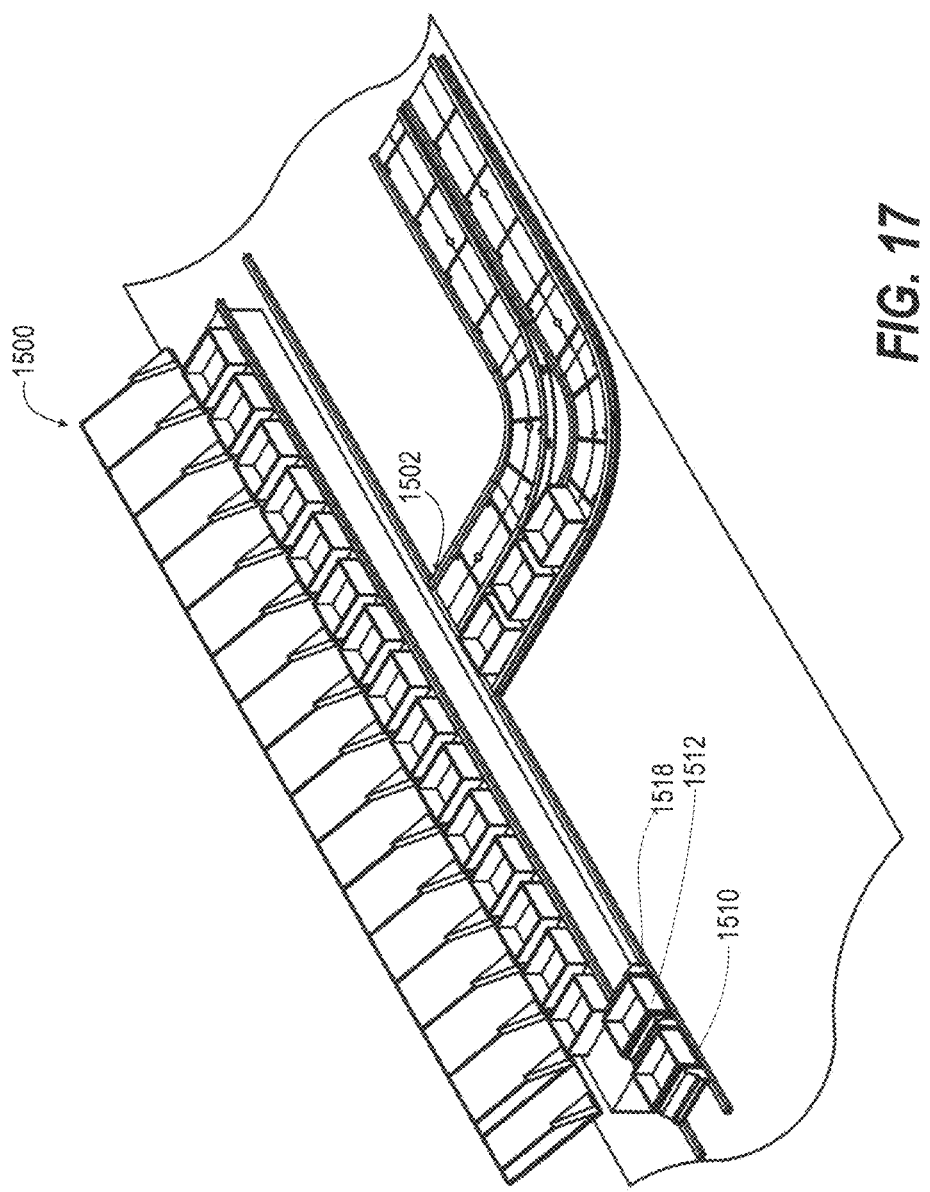
FIG. 17 illustrates an isometric view of the other example order fulfillment section of FIG. 16 with the dual shuttle vehicle having received the full order container, according to one or more embodiments.
Figure 18:
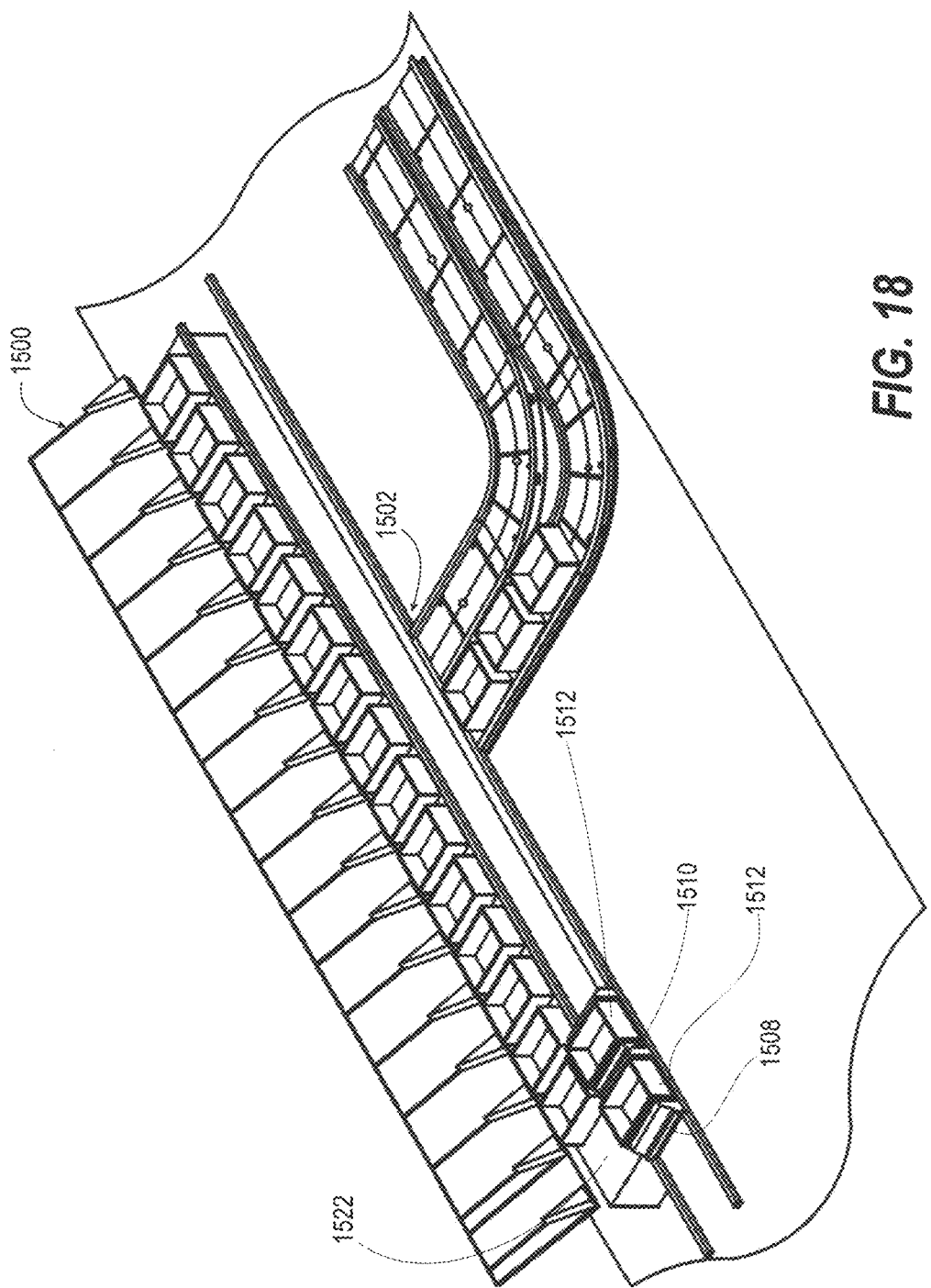
FIG. 18 illustrates an isometric view of the other example order fulfillment section of FIG. 16 with the dual shuttle vehicle having the shuttle holding an empty order container indexed with the now empty destination, according to one or more embodiments.
Figure 19:
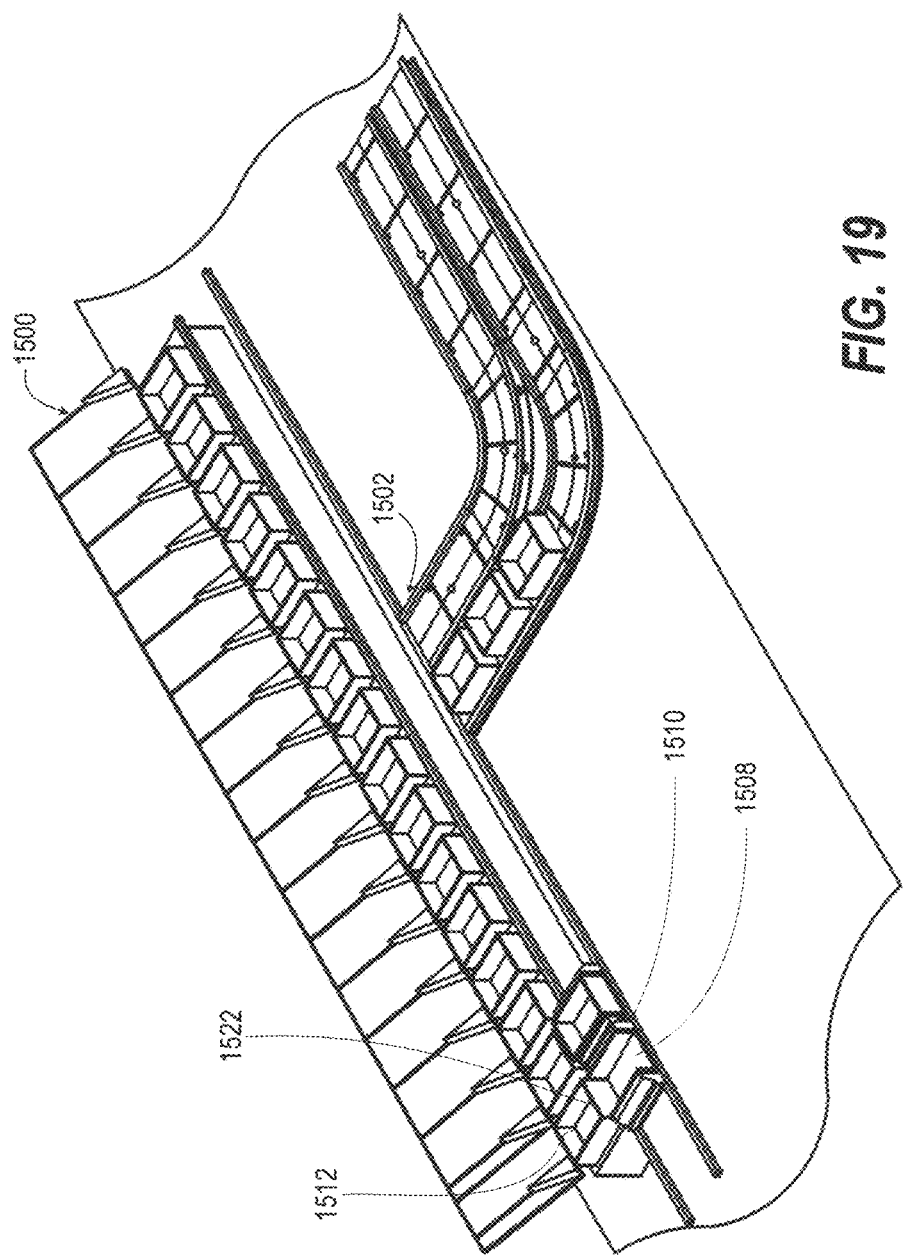
FIG. 19 illustrates an isometric view of the other example order fulfillment section of FIG. 18 with the empty order container moved from the dual shuttle vehicle to the destination, according to one or more embodiments.
Figure 20:
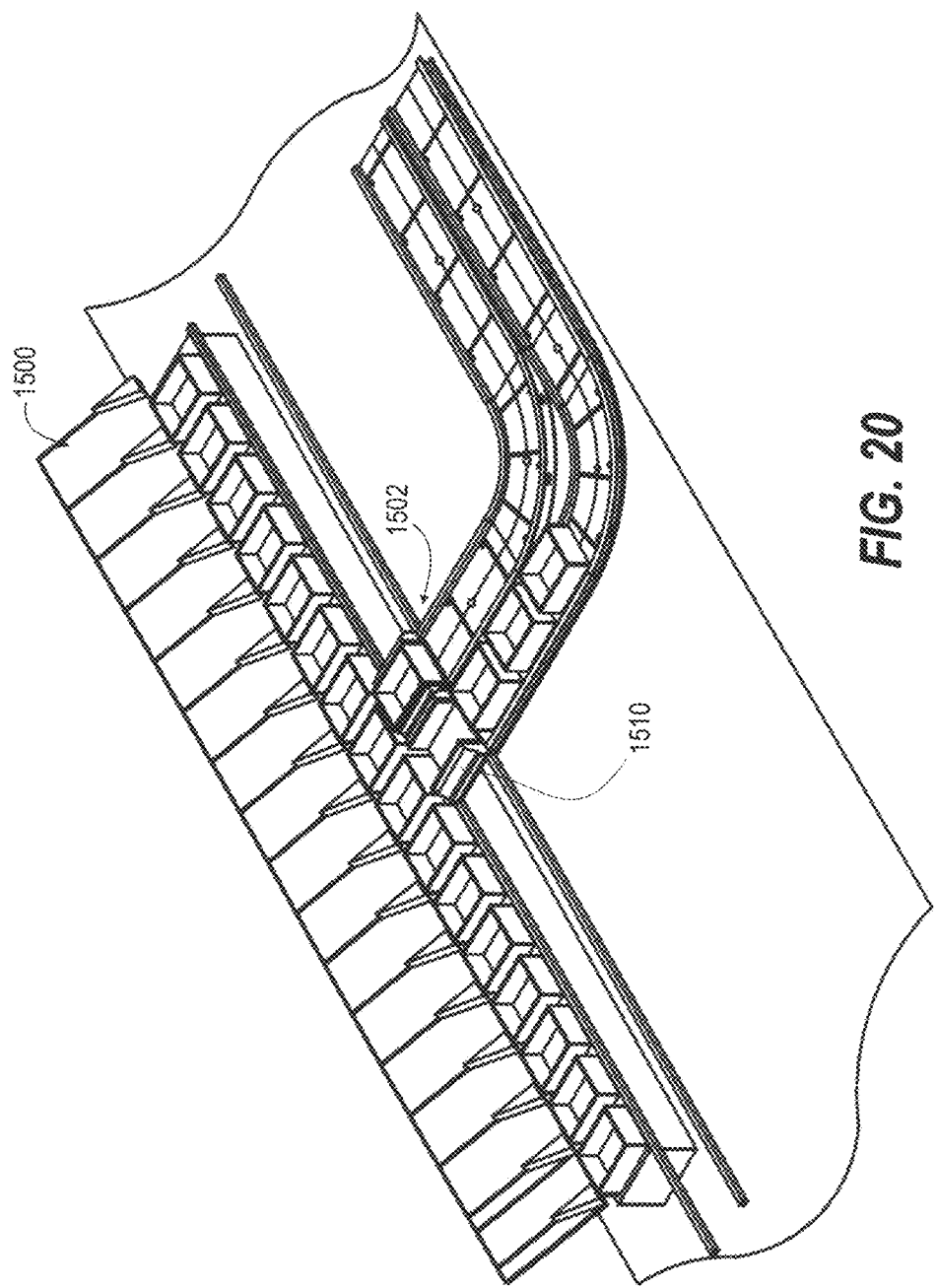
FIG. 20 illustrates an isometric view of the other example order fulfillment section of FIG. 19 with the dual shuttle vehicle moved to the P/D station, according to one or more embodiments.
Figure 21:
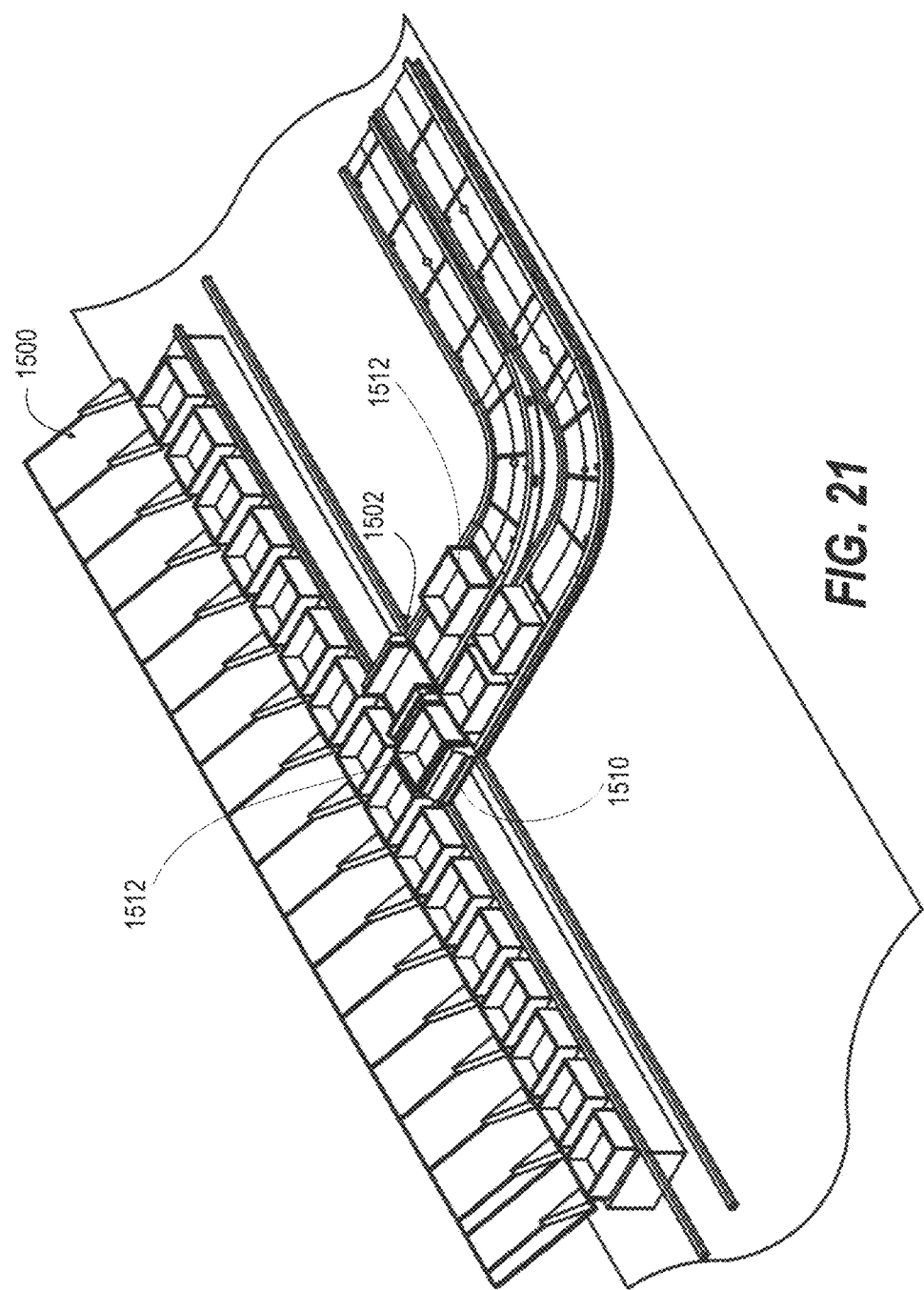
FIG. 21 illustrates an isometric view of the other example order fulfillment section of FIG. 20 with the dual shuttle vehicle receiving an empty container from the P/D station and transferring the full order container to the P/D station, according to one or more embodiments.

FIG. 16 illustrates the other example order fulfillment section 1500 with the dual shuttle vehicle 1510 having an empty shuttle 1518 aligned with a destination 1522 having a full order container 1512. FIG. 17 illustrates the other example order fulfillment section 1500 with the dual shuttle vehicle 1510 having received the full order container 1512 on shuttle 1518. FIG. 18 illustrates the other example order fulfillment section 1500 with the dual shuttle vehicle 1510 having the shuttle 1508 holding an empty order container 1512 indexed with the now empty destination 1522. FIG. 19 illustrates the other example order fulfillment section 1500 with the empty order container 1512 moved from shuttle 1508 of the dual shuttle vehicle 1510 to the destination 1522. FIG. 20 illustrates the other example order fulfillment section 1500 with the dual shuttle vehicle 1510 moved to the P/D station 1502. FIG. 21 illustrates the other example order fulfillment section 1500 with the dual shuttle vehicle 1510 receiving an empty container 1512 from the P/D station 1502 and transferring the full order container 1512 to the P/D station 1502.

Figure 23:
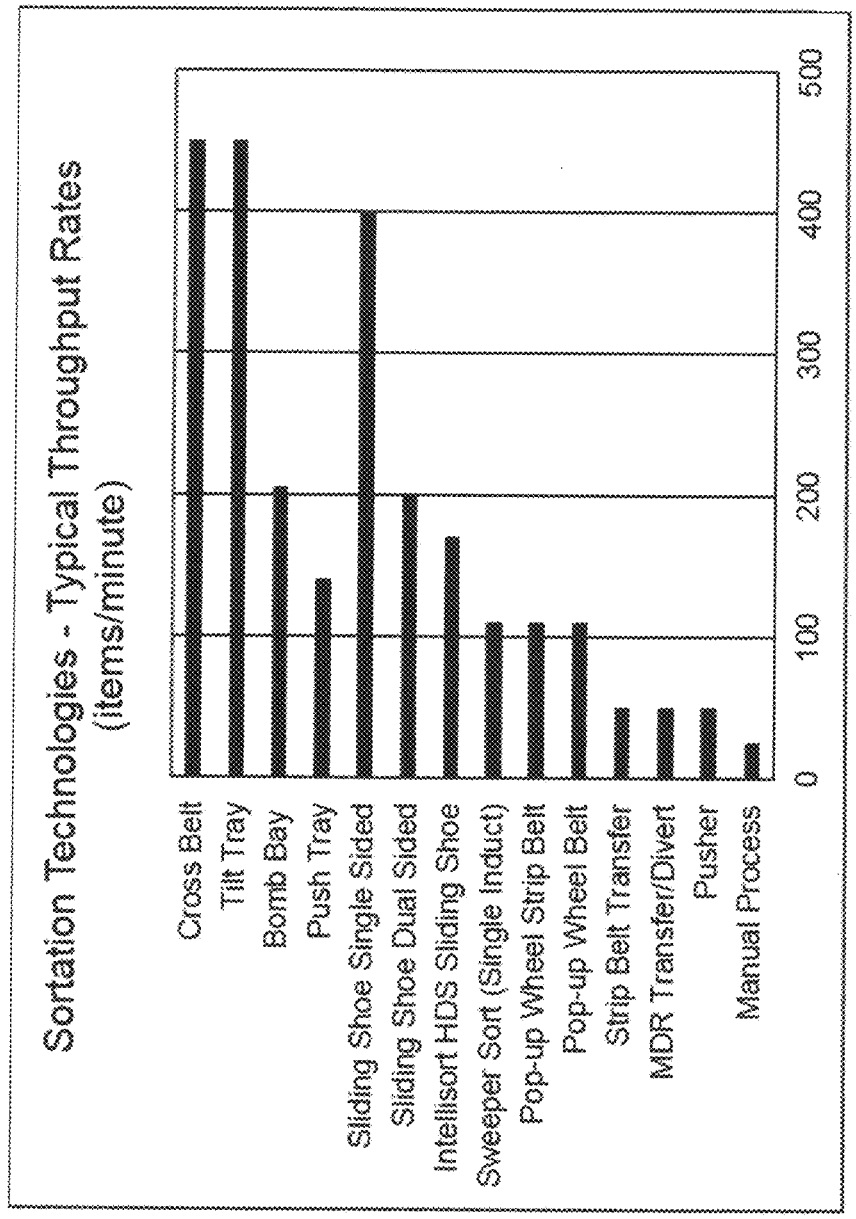
FIG. 23 illustrates a graphical plot of throughput rates for these various types of sorters.

FIG. 22 illustrates a table 2200 of how various kinds of sorters handle a range of product types that are typically handled in e-commerce and store replenishment in the distribution and fulfillment industry. Omitted are special purpose sorters design for a uniform set of articles, such as a mail sorter. For example, use of a stripper type of linear sorter to take a top letter off of a stack would not work for almost all of the stock keeping units (SKUs) typically warehoused in a distribution center. FIG. 23 illustrates a graphical plot 2300 of throughput rates for these various types of sorters. In both FIGS. 22-23, a particular sliding shoe sorter is noted as Intellisort HDS that is the fastest available in the industry for incorporating a high speed divert as described in U.S. Pat. No. 7,516,835. The speed and ability to handle a wide variety of products makes a loop sorter especially efficacious in sorting the articles to particular order containers. Use of a shuttle to quickly replace any completed order maintains a large number of destinations for receiving new orders. The combination alleviates the needs human operators, such as using put/pick walls, to complete order fulfillment. A particular article can be brought from receiving or from storage to a loop sorter, into an order container, and moved by shuttle to a take away system without being compromised by human interaction.

By virtue of the foregoing, aspects of the present innovation can include a material handling system having: (i) a sortation conveyor that receives articles from an induction conveyor and selectively dispenses the articles at one of one or more destination containers longitudinally aligned on a selected lateral side on a container support structure; (ii) a central controller communicably coupled to a validation device of the induction conveyor to receive a first input signal and to a tracking device of the sortation conveyor to receive a second input signal; and (iii) at least one transport mechanism including a support structure to support and transport one of an empty destination container from an inlet conveyor and the one of one or more destination containers to an outlet conveyor, wherein the at least one transport mechanism is configured to extract the one of one or more destination containers from the container support structure and replace the one of one or more destination containers with the empty destination container on the container support structure based on a control signal received from the central controller.

In a particular aspect, the sortation conveyor of the material handling system can include one or more guide structures, each positioned to redirect the articles to their corresponding one of one or more destination containers located on the container support structure.

In another particular aspect, each of the one or more destination containers of the material handling system receives the articles that corresponds to independent orders received by the central controller for order fulfillment.

In an additional particular aspect, the inlet conveyor of the material handling system can be a first transport conveyor aligned with and proximate to the container support structure to supply the empty destination container.

In a further particular aspect, the outlet conveyor of the material handling system can be a second transport conveyor aligned with and proximate to the container support structure to receive one of one or more destination containers including articles corresponding to the independent orders fulfilled by the central controller.

In yet another particular aspect, the at least one transport mechanism of the material handling system can be a shuttle device aligned with and proximate to the container support structure on an opposite side to the first transport conveyor and the second transport conveyor. In one exemplary embodiment, the shuttle device comprises a first pair of arms that extend towards the first transport conveyor to retrieve the empty destination container and extend towards the container support structure to displace the empty destination container from the shuttle device. In another exemplary embodiment, the shuttle device comprises a second pair of arms that extend towards the container support structure to retrieve the one or more destination containers that have received articles corresponding to the independent orders and extend towards the second transport conveyor to displace the empty destination container from the shuttle device.

In yet an additional particular aspect, the first input signal can be indicative of a validation information of each article confined to an order received at the central controller of the material handling system. The validation of each article occurs at one of the validation device and a validation server. In an exemplary embodiment, the first input signal is further indicative of an identity of each article and their associated attributes; the identity of each article comprises one of serial number, part number, destination address and their combination; and the associated attributes comprises one of weight, color, size or shape.

In yet another particular aspect, the second input signal is indicative of a tracking information of each article confined to the order received at the central controller of the material handling system. In an exemplary embodiment, the tracking information comprises one of a location of each article, position of each article and redirection information of each article included in the selected order to their respective one of one or more destination containers. In at least one exemplary embodiment, each article may include a tracking number that uniquely identifies each article guided through the sortation conveyor.

In another particular aspect, the controller of the material handling system triggers the control signal based on the first input signal and the second input signal to operate the at least one transport mechanism.

In additional aspect, the sortation conveyor of the material handling system comprises a linear sortation conveyor.

In a further aspect, the sortation conveyor of the material handling system comprises a loop sortation conveyor.

In yet a further aspect, the at least one transport mechanism receives the control signal to initiate the movement towards the one of one or more destination containers containing articles validated and tracked based on the order received at the central controller of the material handling system.

In yet an additional aspect, the at least one transport mechanism of the material handling system receives the control signal to initiate the extraction of the one of one or more destination containers containing the articles fulfilled for the received order and the insertion of the empty destination container in place of the one of one or more destination containers.

In yet another aspect, the validation device and the tracking device of the material handling system automatically validates and tracks each article corresponding to the selected order without any human interaction. The validation device is a validation scanner comprising an article information storage unit, and wherein the tracking device is one of a belt optical encoders, a series of RFID interrogators, over-the-belt cameras, photo eye, or photo sensor, article pass detection sensor, limit switch, proximity sensors and their like combinations.

In another aspect, the validation scanner of the material handling system is adapted to read a printed visual representation on each of the article. The printed visual representation corresponds to a unique article information of each article required for performing a validation.

In an additional aspect, the printed visual representation may be read using one or more operations such as bar code scanning, laser sensing, vision sensing, digitally imaging, ultraviolet sensing, or radio frequency identification device reading.

By virtue of the foregoing, aspects of the present innovation provide a method that includes: (i) receiving a first input signal from a validation device; (ii) receiving a second input signal from a tracking device; and (iii) generating a control signal based on the first input signal and the second input signal. The control signal operates at least one transport mechanism to extract one of one or more destination containers from a container support structure and replace the one of one or more destination containers with an empty destination container on the container support structure.

In one aspect, the first input signal is indicative of a validation information of each article included in a selected order. The validation of each article occurs at one of the validation device and a validation server.

In another aspect, the first input signal is further indicative of an identity of each article and their associated attributes. The identity of each article comprises one of serial number, part number, destination address and their combination. The associated attributes comprise one of weight, color, size or shape.

In an additional aspect, the second input signal is indicative of a tracking information of each article included in the selected order. In an exemplary embodiment, the tracking information comprises movement, status and location of each article corresponding to the selected order received at a central controller.

By virtue of the foregoing, aspects of the present innovation provides a method that includes: (i) conveying a plurality of articles on one or more entry conveyors; (ii) scanning the plurality of articles on the one or more entry conveyors to identify and validate each article; (iii) inducting each of the identified and validated article from the one or more entry conveyors to a sortation conveyor; (iv) sorting each article corresponding to a received order by the sortation conveyor into destination containers longitudinally aligned on a selected lateral side on a container support structure; (v) tracking each article corresponding to the received order along a length of the sortation conveyor; and (vi) operating at least one transport mechanism to transport a destination container containing articles corresponding to the received order fulfilled by a controller, wherein the transport of the destination containers comprises extracting each destination container corresponding to the received order from the container support structure and replacing the each destination container with an empty destination container on the container support structure.

In one aspect, the at least one transport mechanism includes more than one support structure capable of extracting the destination containers containing articles corresponding to the received order and inserting the empty destination container in place of the extracted destination containers simultaneously.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In accordance with various aspects of the disclosure, an element, or any portion of an element, or any combination of elements may be implemented with a "processing system" that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executes instructions to effect a result is a processing system which is configured to perform tasks causing the result, such as by providing instructions to one or more components of the processing system which would cause those components to perform acts which, either on their own or in combination with other acts performed by other components of the processing system would cause the result. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

"Processor" means devices which can be configured to perform the various functionality set forth in this disclosure, either individually or in combination with other devices. Examples of "processors" include microprocessors, microcontrollers, digital signal processors (DSPs), field programmable gate arrays (FPGAs), programmable logic devices (PLDs), programmable logic controllers (PLCs), state machines, gated logic, and discrete hardware circuits. The phrase "processing system" is used to refer to one or more processors, which may be included in a single device, or distributed among multiple physical devices.

"Instructions" means data which can be used to specify physical or logical operations which can be performed by a processor. Instructions should be interpreted broadly to include, code, code segments, program code, programs, subprograms, software modules, applications, software applications, software packages, routines, subroutines, objects, executables, threads of execution, procedures, functions, hardware description language, middleware, etc., whether encoded in software, firmware, hardware, microcode, or otherwise.

The various embodiments may be implemented in any of a variety of computing devices. A computing device will typically include a processor coupled to volatile memory and a large capacity nonvolatile memory, such as a disk drive of Flash memory. The computing device may also include a floppy disc drive, solid state drive, and a compact disc (CD) drive coupled to the processor. The computing device may also include a number of connector ports coupled to the processor for establishing data connections or receiving external memory devices, such as a USB or FireWire™ connector sockets, or other network connection circuits for establishing network interface connections from the processor to a network or bus, such as a local area network coupled to other computers and servers, the Internet, the public switched telephone network, and/or a cellular data network. The computing device may also include the trackball or touch pad, keyboard, and display all coupled to the processor.

The various embodiments may also be implemented on any of a variety of commercially available server devices. Such a server typically includes a processor coupled to volatile memory and a large capacity nonvolatile memory, such as a disk drive. The server may also include a floppy disc drive, compact disc (CD) or DVD disc drive coupled to the processor. The server may also include network access ports coupled to the processor for establishing network interface connections with a network, such as a local area network coupled to other computers and servers, the Internet, the public switched telephone network, and/or a cellular data network.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A material handling system comprising:
   a loop sortation conveyor that receives articles and selectively dispenses an article at one of more than one destination;
   a container support structure proximate to each of the more than one destination to hold more than one container;
   more than one guide structure, each positioned at the respective one of more than one destination to direct the article to a corresponding container of the more than one container on the container support structure;
   a shuttle support structure aligned with and proximate to the container support structure on an first side and aligned with a transport conveyor on an opposite side; and
   at least one shuttle vehicle configured for movement on the shuttle support structure to carry at least one container between the container support structure and the transport conveyor, wherein the at least one shuttle vehicle comprises at least one load handler that is configured to receive the corresponding container from the container support structure and replace it with an empty container.

2. The material handling system of claim 1, wherein the transport conveyor is aligned with and proximate to the container support structure to receive containers that have received an order comprising selected articles of the articles, wherein the load handler includes a pair of arms that extend toward the empty container provider to retrieve the empty container and that extend toward the container support structure to displace onto the transport conveyor a selected container that has received the order with the empty container from the shuttle vehicle.

3. The material handling system of claim 1, wherein the shuttle vehicle comprises:
   a pair of arms spaced for insertion on each side of a container, each arm comprising a distal finger and a midpoint finger;
   at least one finger actuator to selectively position the finger one of: (i) inwardly along a side of the container facing the shuttle vehicle and (ii) within a space between the container and any adjacent container,
   wherein the distal and midpoint fingers are inwardly positioned to simultaneously move the empty container and the container that has received the order from the shuttle and the container support structure respectively to the container support structure and transport conveyor respectively, and then positioned within the space between the container and any adjacent container for enabling retraction of the pair of arms without contacting the container and the empty container.

4. The material handling system of claim 3, wherein the distal and midpoint fingers radially extend from the respective arm and are received for rotation between an inward, horizontal position and a vertical position.

5. The material handling system of claim 1, wherein the shuttle vehicle comprises a dual shuttle vehicle having tandem first and second shuttles that can respectively carry the empty container and a container that has a completed order.

6. The material handling system of claim 1, wherein the sortation conveyor comprises one of: (i) a bomb bay loop sortation conveyor; (ii) a pusher tray loop sortation conveyor; (iii) a cross belt loop sortation conveyor; and (iv) a tilt tray loop sortation conveyor.

7. The material handling system of claim 1, further comprising:
at least one entry conveyor that receives a train of articles from a trusted receiving system;
a validating scanner that detects identifying information on each of the articles received on the entry conveyor;
an induction conveyor that inducts each of the articles onto the sortation conveyor; and
a controller in communication with the at least one entry conveyor, the validating scanner and the induction conveyor to automatically track and direct each article to the destination without human interaction for validation of each article included in a selected order.

8. The material handling system of claim 1, further comprising an empty container provider positioned on the shuttle support structure to dispense the empty container to the shuttle vehicle.

9. The material handling system of claim 1, further comprises: an inlet conveyor aligned with and proximate to the container support structure to supply empty containers.

10. The material handling system of claim 1, wherein the loop sortation conveyor comprises tracking devices installed at one of an upstream or a downstream end of the sortation conveyor to identify each article guided through the sortation conveyor.

11. The material handling system of claim 1, wherein the shuttle support structure comprises wheel guide rails with a power bus bar.

12. The material handling system of claim 1, further comprises: a pickup/delivery (P&D) station comprised of a discharge end from which the shuttle vehicle receives the empty container and an intake end to which the shuttle vehicle discharges the container that has received the order.

13. A method automating receipt, sortation, order fulfillment and shipment of fully-validated articles, the method comprising:
conveying a train of articles on one or more entry conveyors;
scanning each article on the one or more entry conveyors to identify a type of article;
tracking each article through a material handling system without human interaction;
inducting each article onto a sortation conveyor;
sorting each article by the sortation conveyor into an identified container of one or more containers held by a container support structure;
moving a shuttle vehicle on a shuttle support structure to replenish the selected container, wherein the shuttle support structure is aligned with and proximate to the container support structure on a first side and aligned with a transport conveyor on an opposite side; and
moving, by a shuttle vehicle that is configured for movement on a shuttle support structure that is aligned with an proximate to the container support structure on a first side and a transport conveyor on a second side, a selected container of the one or more container, containing a completed order, from the container support structure onto the transport conveyor and replacing the selected container containing the completed order with an empty container.

14. The method of claim 13, wherein replacing the selected container includes pulling the selected container on the shuttle vehicle while simultaneously pushing the empty container from the shuttle vehicle on to the container support structure.

15. A method for automating order fulfilment in a material handling environment, the method comprising:
receiving articles on a sortation conveyor and selectively dispensing an article at a sortation destination having more than one guide structure;
guiding the article by the more than one guide structure into a selected container from among a plurality of containers positioned on a container support structure;
moving, by a shuttle vehicle moveable on a shuttle support structure that is proximate to the container support structure and a transport conveyor, the selected container containing a completed order from the container support structure onto the transport conveyor and replacing the selected container containing the completed order with an empty container at the corresponding sortation destination.

* * * * *